United States Patent
Migaki et al.

(10) Patent No.: US 10,814,802 B2
(45) Date of Patent: Oct. 27, 2020

(54) VEHICULAR DOOR

(71) Applicant: TOYOTA BOSHOKU KABUSHIKI KAISHA, Aichi-ken (JP)

(72) Inventors: Yohei Migaki, Aichi-ken (JP); Takahisa Onishi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 107 days.

(21) Appl. No.: 16/203,927

(22) Filed: Nov. 29, 2018

(65) Prior Publication Data
US 2019/0161026 A1    May 30, 2019

(30) Foreign Application Priority Data
Nov. 30, 2017   (JP) .................... 2017-230934

(51) Int. Cl.
*B60R 13/02*    (2006.01)
*B60J 5/04*    (2006.01)

(52) U.S. Cl.
CPC ........... *B60R 13/0243* (2013.01); *B60J 5/045* (2013.01); *B60J 5/0413* (2013.01); *B60J 5/0415* (2013.01); *B60J 5/0426* (2013.01); *B60J 5/0469* (2013.01)

(58) Field of Classification Search
CPC ........ B60J 5/0427; B60J 5/0433; B60J 5/042; B60J 5/045; B60J 5/0413; B60J 5/0412; B60J 5/0426; B60J 5/0455; B60J 5/0463; B60J 5/04; B60R 13/0243
USPC ................... 296/146.5–146.7, 37.13
See application file for complete search history.

(56) References Cited

U.S. PATENT DOCUMENTS

| | | | | |
|---|---|---|---|---|
| 4,196,929 A * | 4/1980 | Bauer | ............... | B60J 5/0412 296/146.5 |
| 4,769,951 A * | 9/1988 | Kaaden | ............... | B60J 5/0463 49/502 |
| 5,603,548 A * | 2/1997 | Gandhi | ............... | B60J 5/0451 280/748 |
| 6,015,182 A * | 1/2000 | Weissert | ............... | B60J 5/0404 29/522.1 |
| 6,086,139 A * | 7/2000 | Heim | ............... | B60J 5/0405 296/146.5 |
| 8,863,367 B2 * | 10/2014 | Langenbacher | ....... | B60N 3/101 29/428 |
| 2007/0013206 A1* | 1/2007 | Huttsell | ............... | B60J 5/0451 296/146.6 |
| 2007/0108794 A1* | 5/2007 | Yagi | ............... | B60J 5/0426 296/146.6 |
| 2007/0210612 A1* | 9/2007 | Kidachi | ............... | B60R 13/0815 296/146.6 |
| 2009/0015035 A1* | 1/2009 | Baumgart | ............... | B60J 10/24 296/146.2 |

(Continued)

FOREIGN PATENT DOCUMENTS

JP    S62-23874    1/1987

*Primary Examiner* — Gregory A Blankenship
(74) *Attorney, Agent, or Firm* — Greenblum & Bernstein, P.L.C.

(57) ABSTRACT

A vehicular door includes a resin outer panel and a resin inner panel mounted on a vehicular interior side of the resin outer panel, and the resin inner panel includes a resin body member that configures an interior design surface of the vehicular door and a resin reinforcing member that is arranged on a vehicular exterior side and on a peripheral portion of the resin body member.

14 Claims, 19 Drawing Sheets

(56) References Cited

U.S. PATENT DOCUMENTS

| | | | |
|---|---|---|---|
| 2013/0057018 A1* | 3/2013 | Reese | B60J 5/042 |
| | | | 296/146.6 |
| 2013/0076060 A1* | 3/2013 | Nakashima | B60R 21/04 |
| | | | 296/146.7 |
| 2014/0132030 A1* | 5/2014 | Usami | B60N 2/797 |
| | | | 296/153 |
| 2016/0059678 A1* | 3/2016 | Tamaoki | B60J 5/0455 |
| | | | 49/501 |
| 2016/0144803 A1* | 5/2016 | Jeon | B60J 10/00 |
| | | | 296/146.7 |
| 2017/0036521 A1* | 2/2017 | Ogawa | B62D 29/04 |
| 2017/0080784 A1* | 3/2017 | Kobayashi | B60R 13/0243 |
| 2017/0106812 A1* | 4/2017 | Connell | B60R 13/0206 |
| 2017/0120844 A1* | 5/2017 | Inami | B60R 7/046 |
| 2017/0210210 A1* | 7/2017 | Lange | B60J 5/0408 |
| 2018/0065519 A1* | 3/2018 | Inami | B60N 2/793 |
| 2018/0319346 A1* | 11/2018 | Siqueira | B60R 7/046 |
| 2019/0160921 A1* | 5/2019 | Migaki | B60J 5/0413 |
| 2019/0161026 A1* | 5/2019 | Migaki | B60J 5/0413 |
| 2019/0162008 A1* | 5/2019 | Migaki | B60J 5/0469 |
| 2019/0176591 A1* | 6/2019 | Jeon | B60J 5/0483 |

\* cited by examiner

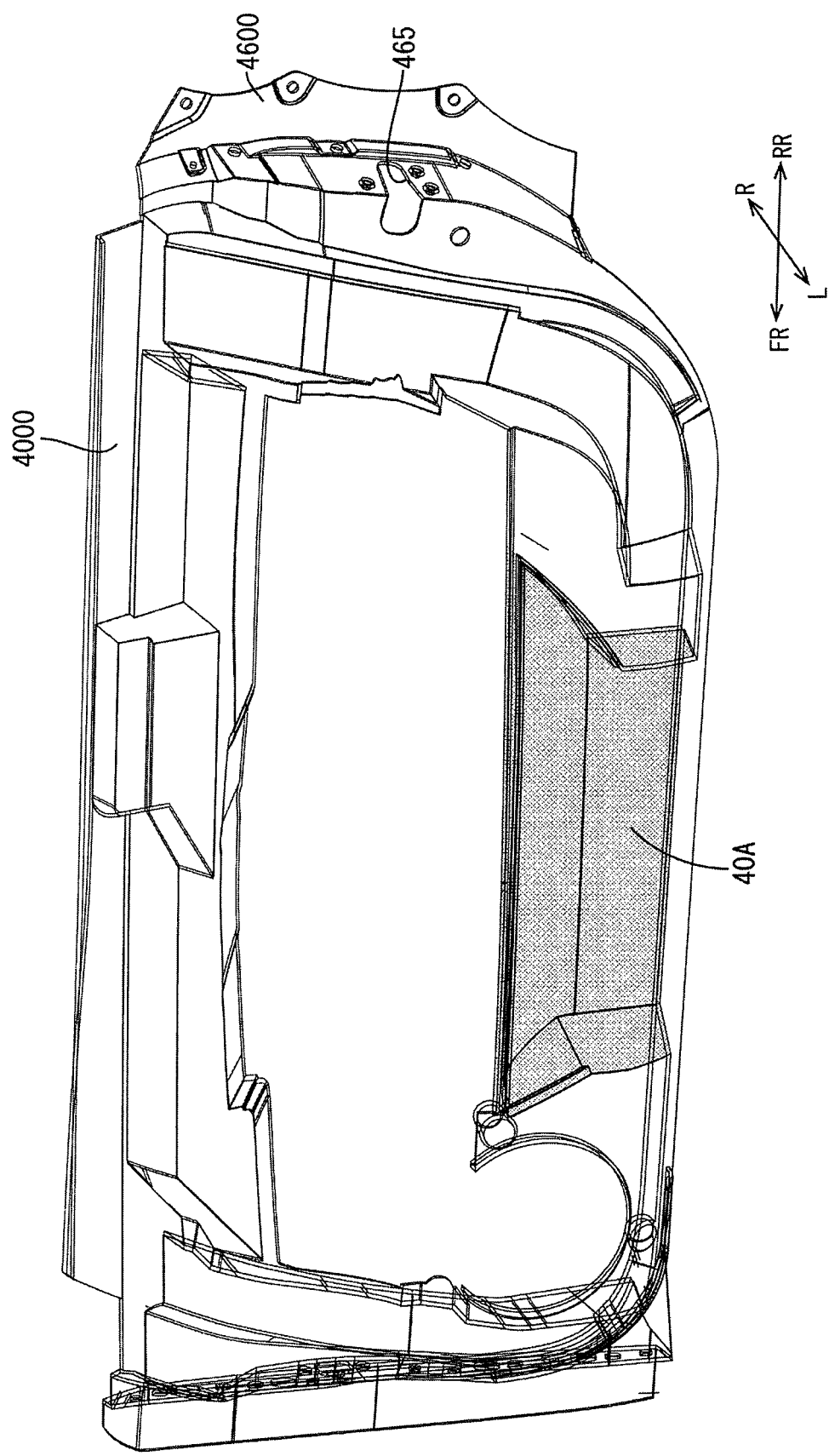

VEHICULAR DOOR

CROSS REFERENCE TO RELATED APPLICATION

This application claims priority from Japanese Patent Application No. 2017-230934 filed on Nov. 30, 2017. The entire contents of the priority application are incorporated herein by reference.

TECHNICAL FIELD

The disclosure described herein relates to a vehicular door.

BACKGROUND

There has been known a vehicular door including a metal panel configuring a door outer surface and a resin trim configuring a door inner surface. It has been known that resin material is used for a component configuring the door outer surface to reduce a weight of the vehicular door. A door outer panel that is made of synthetic resin is fixed to a door inner panel that is a vehicular body component as follows. Screw grommets are attached to the door inner panel made of a steel plate and screw insertion holes are formed in the door outer panel formed of synthetic resin. The tapping screws are inserted through the screw insertion holes of the door outer panel and threaded into the screw grommets such that the door outer panel is fixed to the door inner panel at several portions.

In the above technology, the door outer panel made of resin is mounted in the door inner panel made of the steel plate to reduce the weight and keep strength. However, it is preferable not to use a steel plate component to reduce the weight. A vehicular door without using any steel plate components can be reduced in weight but may not have effective strength.

SUMMARY

An objective of the present technology described herein is to provide a vehicular door that ensures strength thereof with a simple structure while reducing a weight and a cost thereof.

According to the technology described herein, a vehicular door includes a resin outer panel, and a resin inner panel mounted on a vehicular interior side of the resin outer panel, the resin inner panel including a resin body member that configures an interior design surface of the vehicular door and a resin reinforcing member that is arranged on a vehicular exterior side and opposite a peripheral portion of the resin body member.

BRIEF DESCRIPTION OF THE DRAWINGS

FIG. 19 is a perspective view illustrating a structure of a reinforcing member included in a vehicular door according to a second embodiment.

DETAILED DESCRIPTION

Figure 1:
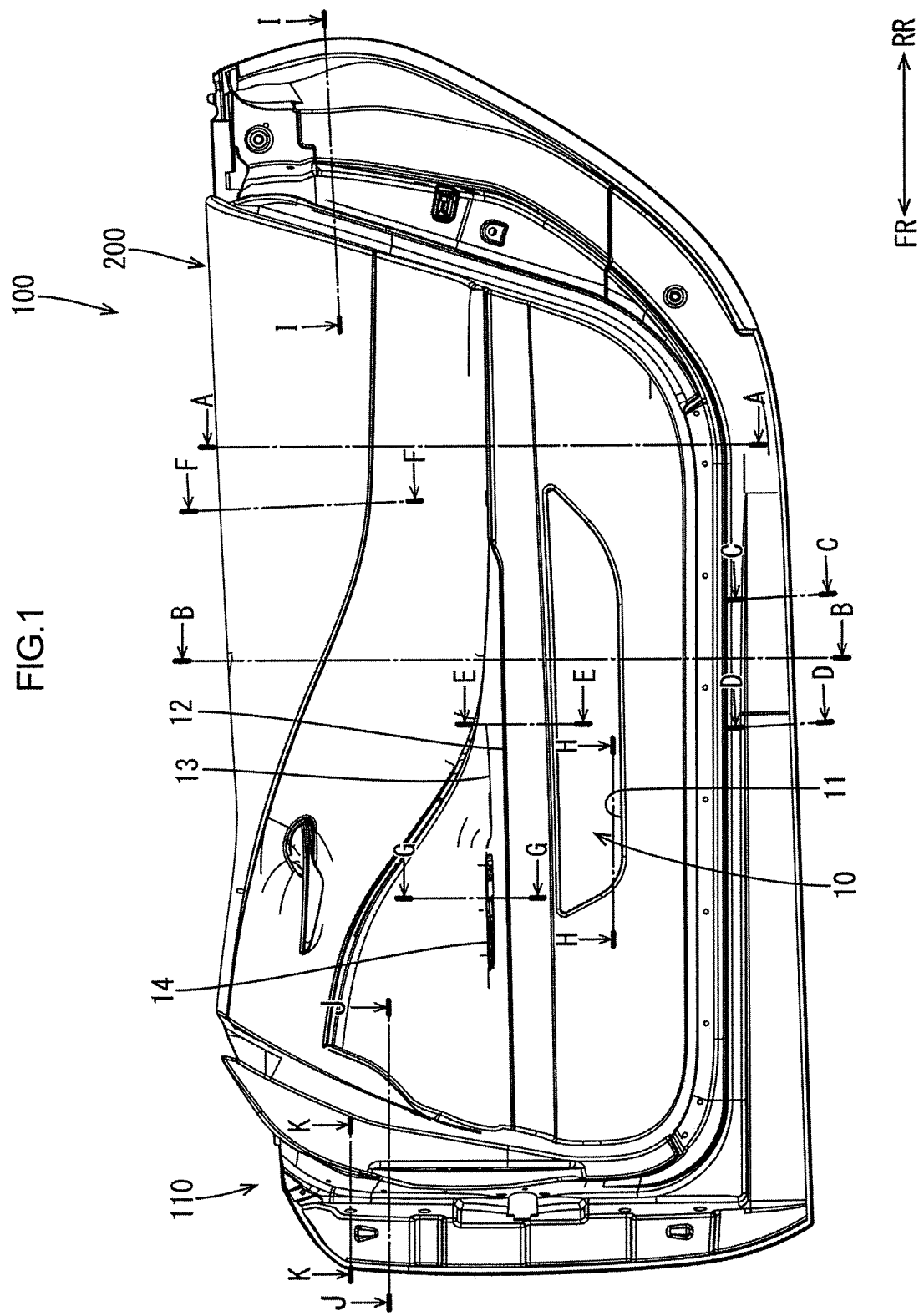
FIG. 1 is a plan view of a vehicular door according to a first embodiment.

One embodiment of the present technology will be described with reference to FIGS. 1 to 18. In the first embodiment section, a front door of an automobile, which is a vehicle, will be described as a vehicular door. In each of the drawings, an arrow FR represents a vehicular front side, an arrow RR represents a vehicular rear side, an arrow L represents a vehicular left side, and an arrow R represents a vehicular right side.

As illustrated in FIGS. 1 to 4, a vehicular door 100 includes an outer panel 500 and an inner panel 200 that are mounted to each other. The outer panel 500 is an outermost panel of a vehicle that forms an outer appearance of the vehicle. The outer panel 500 is a resin outer panel that is made of resin. The inner panel 200 is a panel that is an interior component forming an interior appearance of the vehicle (an interior design surface). The inner panel 200 is a resin inner panel that is made of resin.

In the vehicular door 100 according to this embodiment including the outer panel 500 and the inner panel 200, only the inner panel 200 is connected to a vehicular body 700 (see FIGS. 17 and 18) at a front section thereof with a hinge portion 110. According to such a configuration, the vehicular door 100 can be open and closed with swinging. Any other panel components are not present between the outer panel 500 and the inner panel 200. The outer panel 500 and the inner panel 200 that are opposite each other configure the vehicular door 100.

Figure 4:
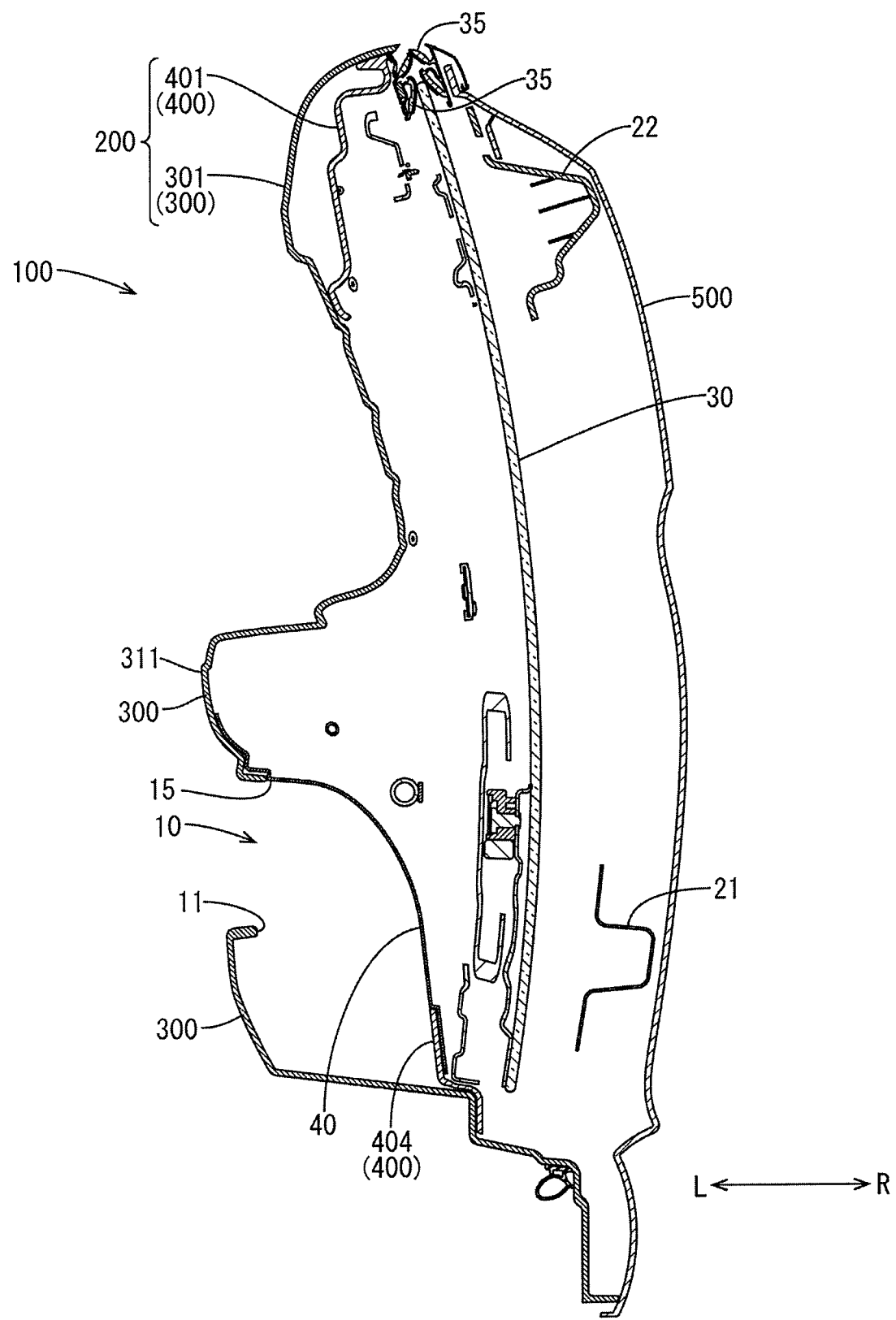
FIG. 4 is a cross-sectional view of a part of the vehicular door according to the first embodiment taken along B-B line in FIG. 1.

As illustrated in FIG. 4, the outer panel 500 has an exterior surface that is formed in an uneven surface according to an outer appearance (an outer appearance design surface) of the vehicle. The outer panel 500 made of resin can be molded with deep drawing and an outer appearance structure can be designed freely. The inner panel 200 includes a pocket opening 11 of a door pocket 10, an armrest 12 on which an occupant of the vehicle put on his/her arm, a handle portion 13 where fingers are put in to open and close the door, and switches 14 including operation switches for opening and closing a door window. Such components are included on an interior surface of the inner panel 200 and the interior surface configures an interior design surface.

Figure 2:
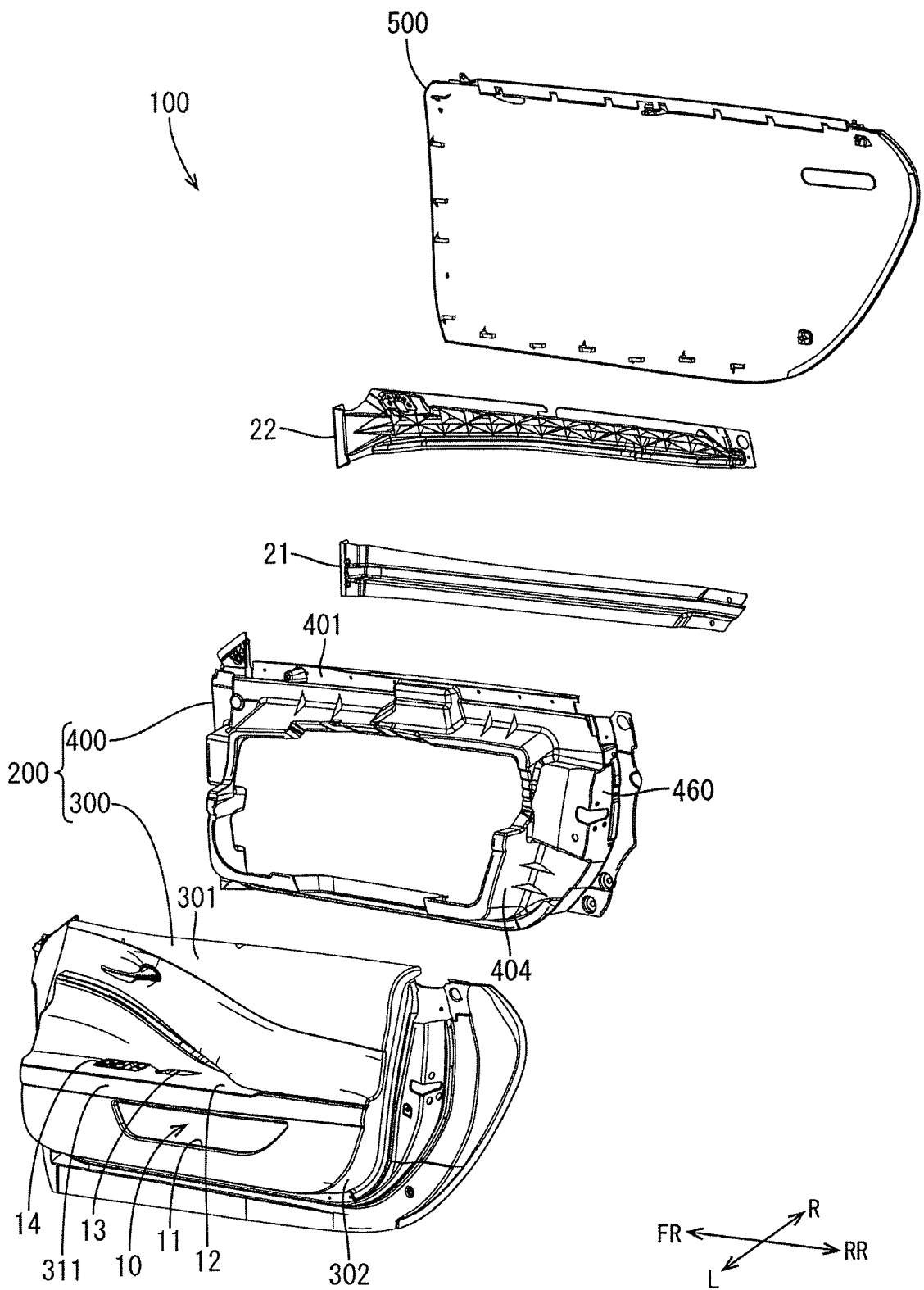
FIG. 2 is an exploded perspective view typically illustrating components of the vehicular door according to the first embodiment.
Figure 3:
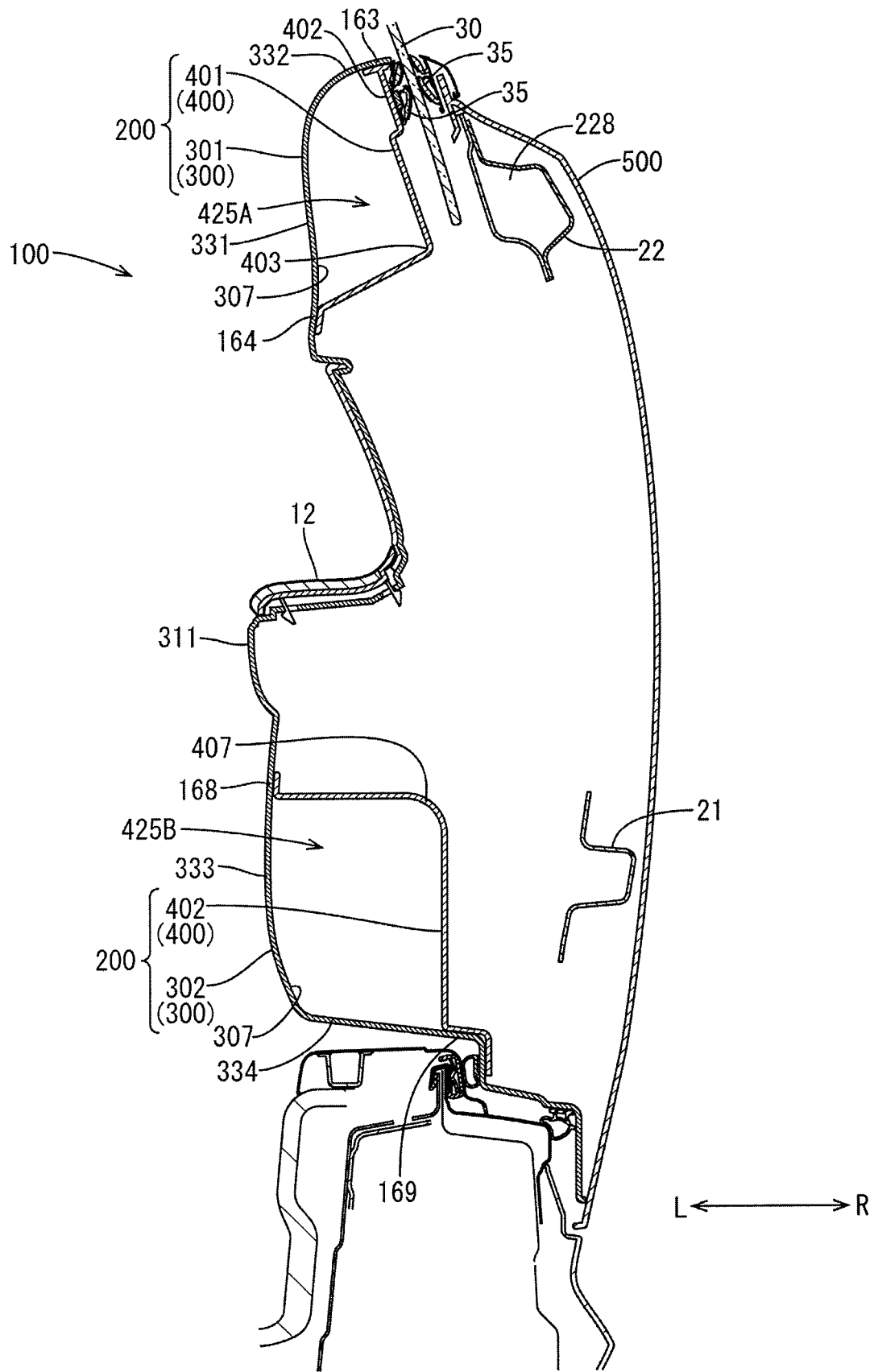
FIG. 3 is a cross-sectional view of a part of the vehicular door according to the first embodiment taken along A-A line in FIG. 1.

As illustrated in FIGS. 2 to 4, the inner panel 200 includes a body member (a resin body member) 300 that configures the interior design surface of the vehicular door 100 and a frame-shaped reinforcing member (a resin reinforcing member, an annular reinforcing member) 400. The reinforcing member 400 is disposed on an outer peripheral section of an exterior surface 307 (an exterior peripheral surface) of the body member 300. In this embodiment, the reinforcing member 400 has a frame shape. However, a pair of reinforcing members extending in a vehicular front-rear direction may be disposed on an upper side and a lower side, respectively.

Examples of resin used for the outer panel 500 may include fiber reinforced resin (that is obtained by mixing glass fiber, carbon fiber, aramid fiber, polyethylene fiber with thermosetting resin such as unsaturated polyester, epoxy resin, polyamide resin, or phenol resin), polyacetal resin, polyamide resin, polycarbonate resin, polyimide resin, and ultra-high molecular weight polyolefin (polyethylene).

Examples of resin used for the body member 300 of the inner panel 200 may include polypropylene resin, polyethylene resin, polystyrene resin, polyester resin, and resin obtained by mixing natural fiber with the above resin. Examples of resin used for the reinforcing member 400 of the inner panel 200 may include fiber reinforced resin (that is obtained by mixing glass fiber, carbon fiber, aramid fiber, polyethylene fiber with thermosetting resin such as unsaturated polyester, epoxy resin, polyamide resin, or phenol resin), polyacetal resin, polyamide resin, polycarbonate resin, polyimide resin, and ultra-high molecular weight polyolefin (polyethylene).

The reinforcing member 400 of the inner panel 200 includes an upper bent section 403 and a lower bent section 407 at an upper section 401 and a lower section 404, respectively. The bent sections 403, 407 are foimed from plate members that project toward the outer panel 500 and extend in the vehicular front-rear direction. The upper bent section 403 and the lower bent section 407 are bent such that first space 425A and a second space 425B are formed by the respective bent sections 403, 407 and the body member 300. The first and second spaces 425 are between the respective upper and lower bent sections 403, 407 and the body member 300 that are opposite in a vehicular interior-exterior direction.

The body member 300 of the inner panel 200 is a plate panel member and includes an upper panel section 301 on an upper side and a lower panel section 302 on a lower side. The upper panel section 301 extends in the vehicular front-rear direction and is curved toward the exterior side as it extends from a middle section 331 thereof with respect to a vertical direction toward an upper section 332 thereof. Namely, the upper panel section 301 is curved to project toward the vehicular interior side at an upper section thereof. The lower panel section 302 extends in the vehicular front-rear direction and is curved toward the exterior side as it extends from a middle section 333 thereof with respect to the vertical direction toward a lower section 334 thereof. Namely, the lower panel section 302 is curved to project toward the vehicular interior side at a lower section thereof. Accordingly, the upper bent section 403 of the reinforcing member 400 and the exterior surface 307 of the upper panel section 301 form the first space 425A therebetween. The lower bent section 407 of the reinforcing member 400 and the exterior surface 307 of the lower panel section 302 form the second space 425B therebetween.

The body member 300 and the reinforcing member 400 are bonded at contact surfaces thereof with adhesive. Specifically, the exterior surface 307 of the upper panel section 301 is bonded to the upper bent section 403 at an upper first bonding part 163 and an upper second bonding part 164. The exterior surface 307 of the lower panel section 302 is bonded to the lower bent section 407 at a lower first bonding part 168 and a lower second bonding part 169. Other than bonding, the body member 300 and the reinforcing member 400 may be fixed to each other with ultrasonic caulking or screw fastening.

Figure 12:
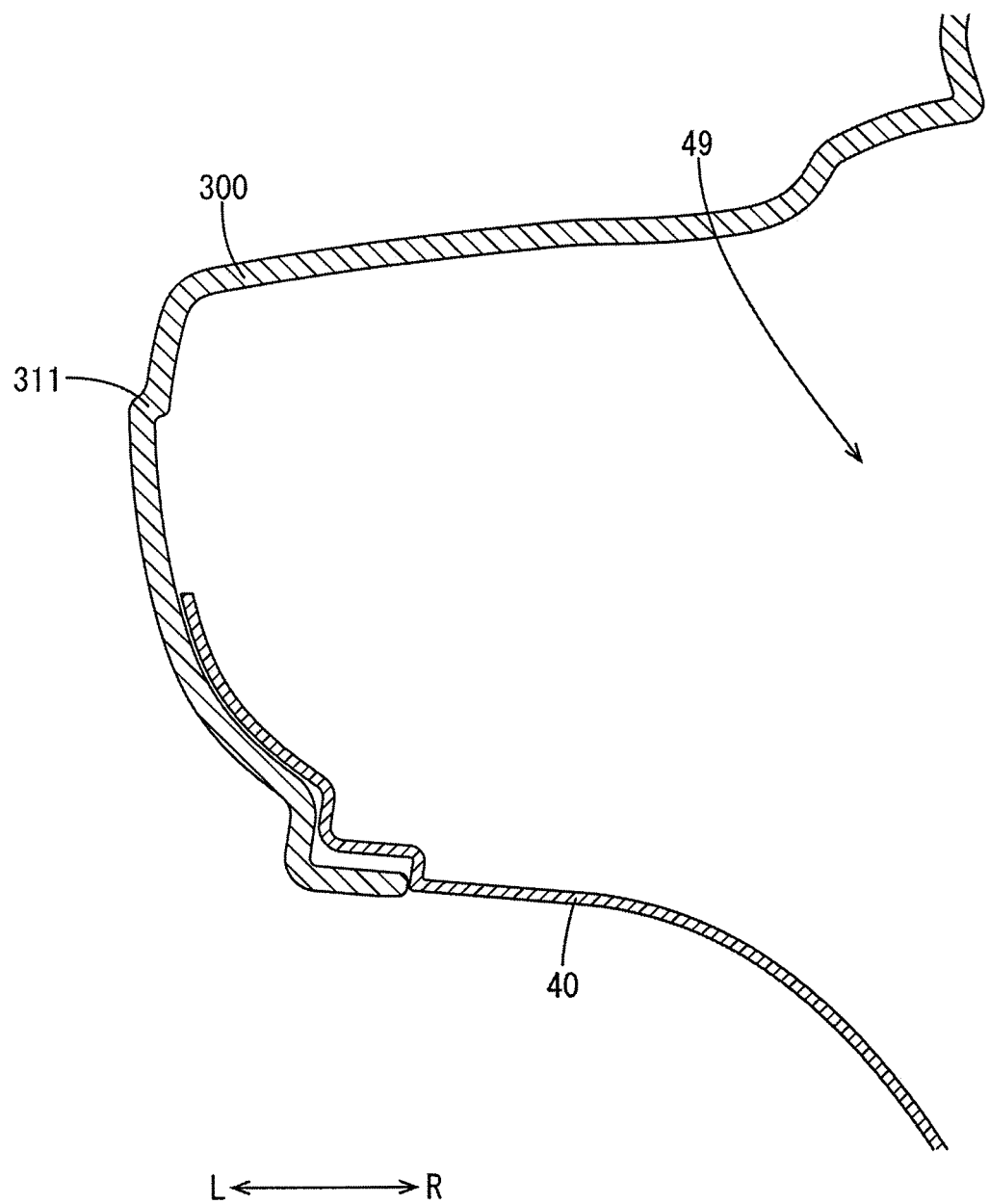
FIG. 12 is a cross-sectional view illustrating a cross-sectional configuration of an armrest of the vehicular door according to the first embodiment and taken along E-E line.
Figure 14:
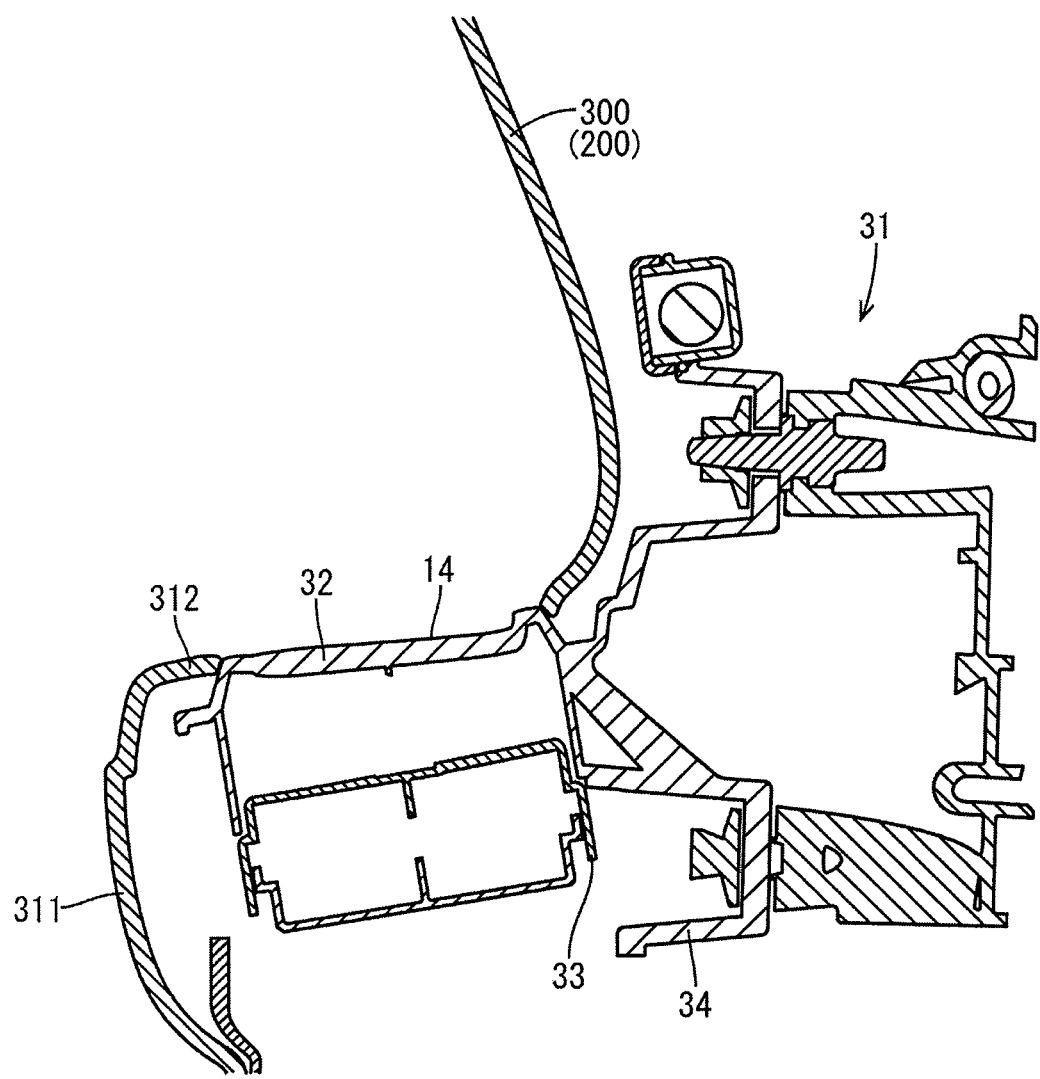
FIG. 14 is a cross-sectional view illustrating a portion of the vehicular door near switches according to the first embodiment and taken along G-G line.

The body member 300 of the inner panel 200 includes a projected section 311 that projects toward the vehicular interior side. As illustrated in FIG. 14, the projected section 311 configures the armrest 12 and includes a switch base 32. The switch base 32 includes switches 14 that provide a window function to the vehicular door 100. The projected section 311 further includes a recess on an upper surface to be recessed downward and the recess configures the handle portion 13 where a user's hand is put (that is held by a user's hand) to open and close the door. The handle portion 13 is formed such that a part of the body member 300 is recessed toward (projected from) an exterior surface of the body member 300. The handle portion 13 is not configured by attaching another component to the body member 300. Therefore, as illustrated in FIG. 12, a separate component for the handle portion 13 is not necessary to be fixed to the projected section 311 and the projected portion 311 configuring the handle portion 13 is not necessary to be fixed to another component with screws on an exterior side 49 (in an exterior side space) of the projected section 311.

An outer reinforcing member 22 is mounted on the vehicular interior side with respect to the upper portion of the outer panel 500. The outer reinforcing member 22 is formed of resin or resin and fiber material. The outer reinforcing member 22 overlaps the upper panel section 301 and the upper bent section 403 (including the first space 425A) with respect to a vehicular interior-exterior direction. Namely, the outer reinforcing member 22 is at a substantially same level as the upper panel section 301 and the upper bent section 403. The outer reinforcing member 22 includes two plate members and at least one of the two plate members is bent to be projected outward (to the exterior side). The two plate members are stacked together and a space 228 is formed between the two plate members with respect to the vehicular interior-exterior direction.

Figure 13:
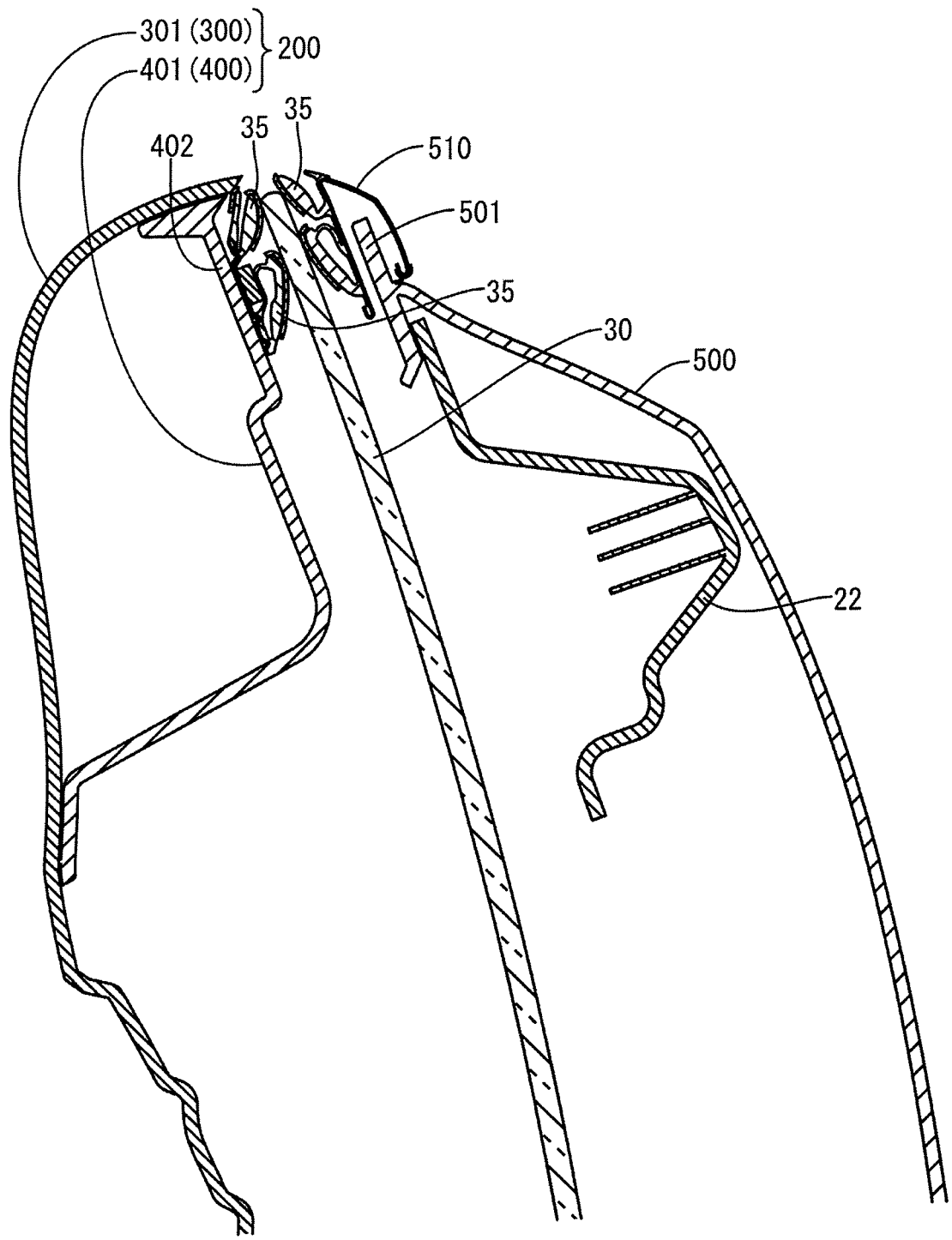
FIG. 13 is a cross-sectional view illustrating a cross-sectional configuration of a portion of the vehicular door near a weather strip according to the first embodiment and taken along F-F line.

A window glass (a plate member) 30 included in a door window is between the outer panel 500 and the inner panel 200 so as to be movable upward and downward. The window glass 30 is a functional component having a function of the door window. For achieving lifting/lowering of the window glass 30, the reinforcing member 400 includes a mounting seat portion 402 at an upper end portion of the upper section 401 thereof as illustrated in FIG. 13. The mounting seat portion 402 projects toward the exterior side. A weather strip (a buffer member) 35 is mounted on the exterior side surface of the mounting seat portion 402 to close a space between the exterior side surface of the mounting seat portion 402 and the window glass 30 and allow the window glass 30 to be lifted and lowered. A mounting seat portion 510 is disposed on an upper end portion 501 of the outer panel 500 and the weather strip 35 is mounted on the vehicular interior side surface of the mounting seat portion 510. The weather strips 35 mounted on the respective mounting seat portions 402, 510 are opposite each other and the window glass 30 is movable between the weather strips 35.

An impact beam 21 is mounted on the vehicular interior side of the outer panel 500 at a lower section thereof. The impact beam 21 extends in the vehicular front-rear direction and absorbs shock from the exterior side. The impact beam 21 overlaps and is opposite the lower bent section 407 of the reinforcing member 400 with respect to the vehicular interior-exterior direction. The lower bent section 407 (an impact beam opposite bent section) is formed from a plate member that is bent to project toward the outer panel 500. According to such a configuration, the second space 425B is surrounded by the lower bent section 407 (the impact beam opposite bent section) and the body member 300 with respect to the vehicular interior-exterior direction and is an impact beam overlapping space. Such a configuration of the second space 425B, the lower bent section 407 (the impact beam opposite bent section), the body member 300, and the impact beam 21 that overlap each other appropriately absorbs shock acting on an occupant from the exterior side.

The lower panel section 302 of the body member 300 included in the inner panel 200 has a pocket opening 11. As illustrated in FIG. 4, a lower edge of the projected section 311 of the body member 300 and an inner edge of the lower section 404 of the reinforcing member 400 has a pocket hole 15 therebetween. A cover member 40 is disposed to cover the pocket hole 15 from the exterior side with respect to the body member 300 and the reinforcing member 400. A space that is on the exterior side with respect to the pocket opening 11 and is surrounded by the lower portion of the body member 300 below the pocket opening 11 and the cover member 40 is an inner space of the door pocket 10. The door pocket 10 is open at an interior design surface of the vehicular door 100.

Figure 10:
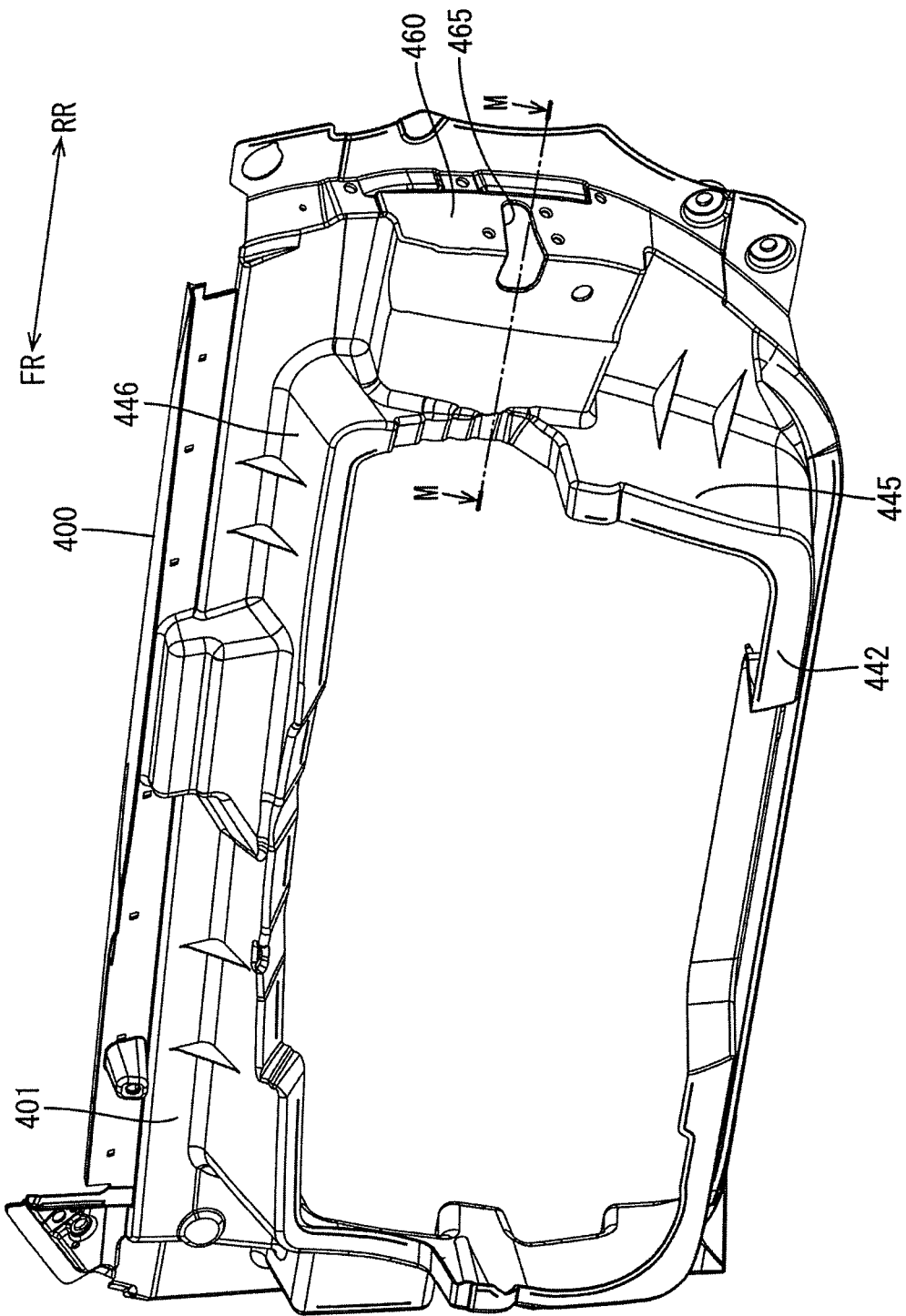
FIG. 10 is a perspective view illustrating a configuration of a reinforcing member of the inner panel of the vehicular door according to the first embodiment.
Figure 11:
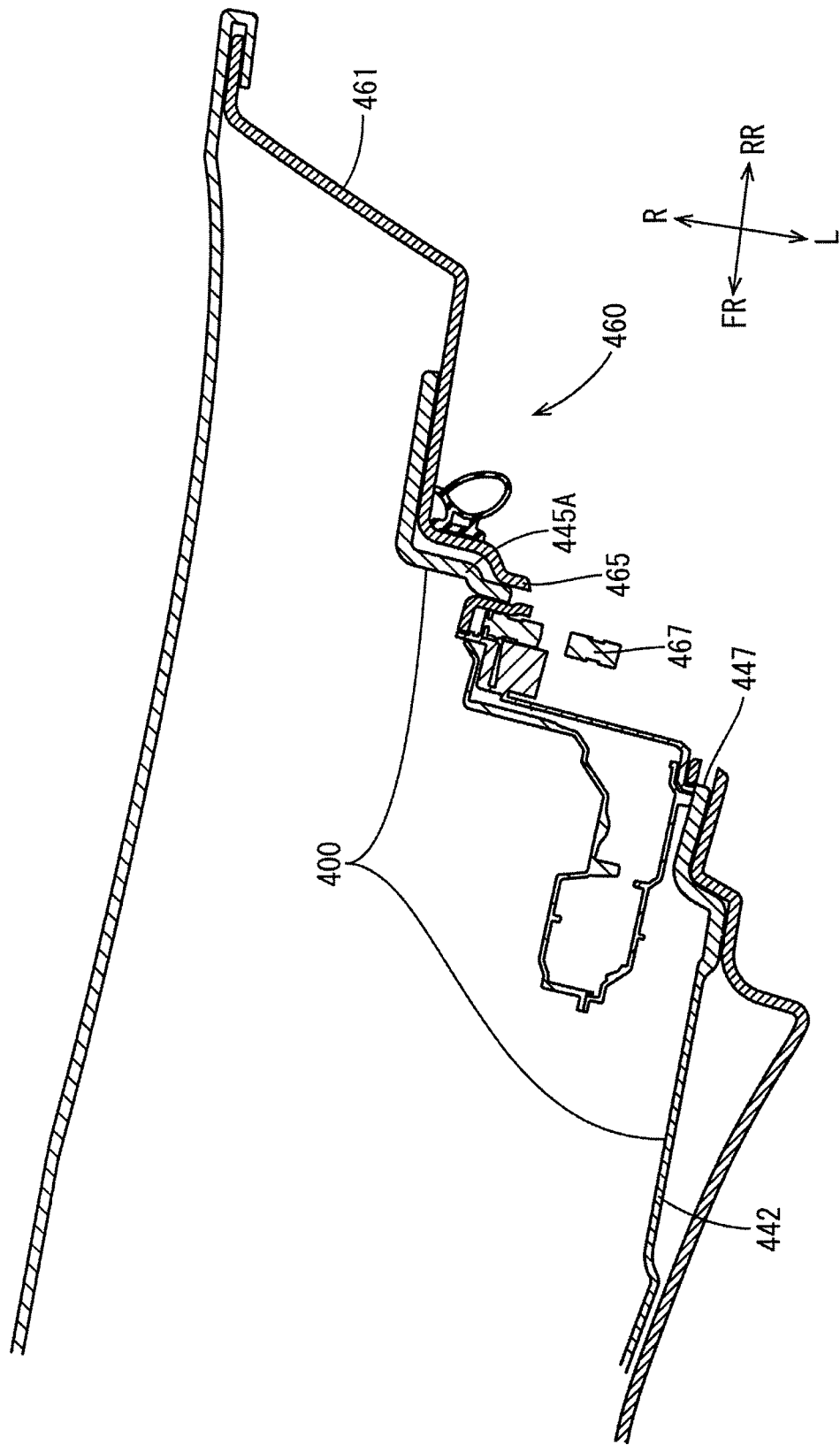
FIG. 11 is a cross-sectional view illustrating a locking mechanism included in the reinforcing member taken along M-M line in FIG. 10.

As illustrated in FIG. 10, the reinforcing member 400 of the inner panel 200 includes a rear wall 445 and an upper wall 446. The rear wall 445 extends from the interior surface of the rear portion of the reinforcing member 400 with respect to the vehicular front-rear direction to the exterior surface of the body member 300. The upper wall 446 extends from the interior surface of the upper edge portion of the reinforcing member 400 to the exterior surface of the body member 300. As illustrated in FIG. 11, the rear wall 445 includes a locking mechanism 460 for locking the vehicular door 100 with the vehicular body 700 (see FIGS. 16, 17, 18). The locking mechanism 460 includes a key stopper 467 included in the vehicular door 100, a locking mechanism mounting portion 445A and a locking mechanism housing portion 461 to which the locking mechanism including the key stopper 467 is mounted, a hole 447 formed in the locking mechanism mounting portion 445A, and a hole 466 formed in the locking mechanism housing portion 461. The locking mechanism mounting portion 445A is a part of the rear wall 445. A key member included in the vehicular body 700 is inserted through the holes 447, 465 and locked with the key stopper 467 included in the vehicular door 100 as illustrated in FIG. 11.

In such a locking mechanism 460, the key stopper 467 is mounted in the locking mechanism mounting portion 445A and the locking mechanism housing portion 461 and the vehicular door 100 is locked with the vehicular body 700 at the key stopper 467 that is mounted in the locking mechanism mounting portion 445A and the locking mechanism housing portion 461 of the locking mechanism 460. Therefore, the locking mechanism mounting portion 445A and the locking mechanism housing portion 461 of the locking mechanism 460 are required to have high rigidity. In this embodiment, the locking mechanism mounting portion 445A and the locking mechanism housing portion 461 of the locking mechanism 460 are thicker than a normal portion 442 of the rear wall 445 that is an extended end portion and the upper wall 446. Thus, the rigidity of the locking mechanism 460 and the portion of the rear wall 445 near the locking mechanism 460 is increased.

According to this embodiment, the inner panel 200 including the body member 300 and the reinforcing member 400 is made of resin and therefore, the thickness of the inner panel 200 can be changed easily at different parts and the rigidity of the inner panel 200 can be changed easily at different parts. The outer panel 500 is also made of resin and therefore, the thickness of the outer panel 500 can be easily changed at different parts and the rigidity can be also changed easily at different parts. The locking mechanism 460 is configured to lock a resin molded component to the reinforcing member 400 or may be configured to be molded integrally with the reinforcing member 400.

Figure 5:
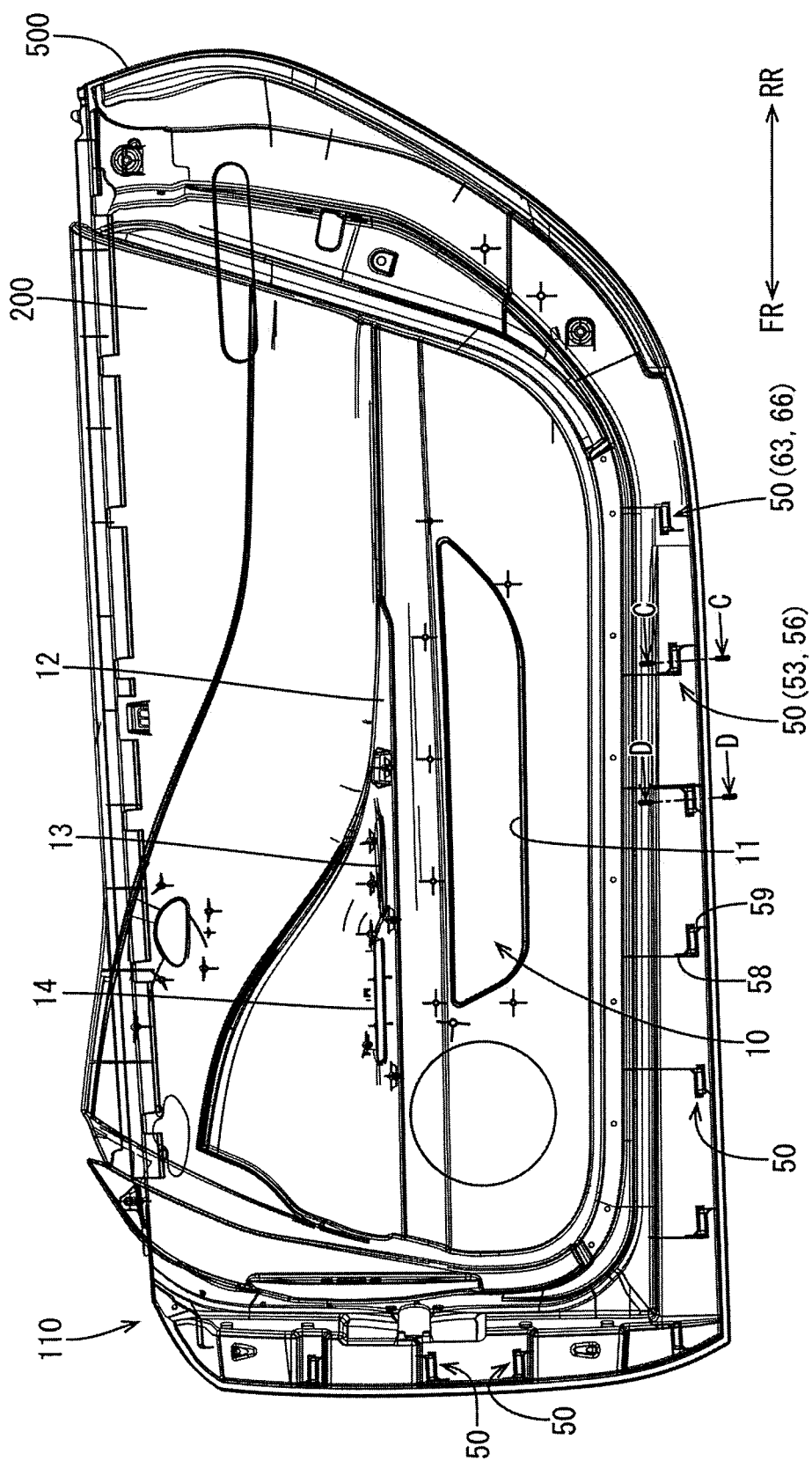
FIG. 5 is an elevation view illustrating the vehicular door according to the first embodiment including an outer panel and an inner panel that are mounted to each other.

A mounting mechanism of the outer panel 500 and the inner panel 200 will be described below. FIG. 5 is a plan view illustrating the vehicular door 100 a part of which is transparent to illustrate the mounting mechanism of the outer panel 500 and the inner panel 200. As illustrated in FIG. 5, the outer panel 500 and the inner panel 200 are mounted to each other with stoppers 50 included at a peripheral section of the door. The stoppers 50 disposed on a lower section of the vehicular door 100 are arranged in the vehicular front-rear direction and the stoppers 50 disposed on a front section of the vehicular door 100 are arranged vertically. All the stoppers 50 are arranged at different levels. Specifically, the stoppers 50 include outer side stoppers 53, 63 that project from the interior surface of the outer panel 500 and inner side stoppers 56, 66 that project from the exterior surface of the inner panel 200. The outer side stoppers 53, 63 and the inner side stoppers 56, 66 are connected so that the outer panel 500 and the inner panel 200 are joined.

Figure 9:
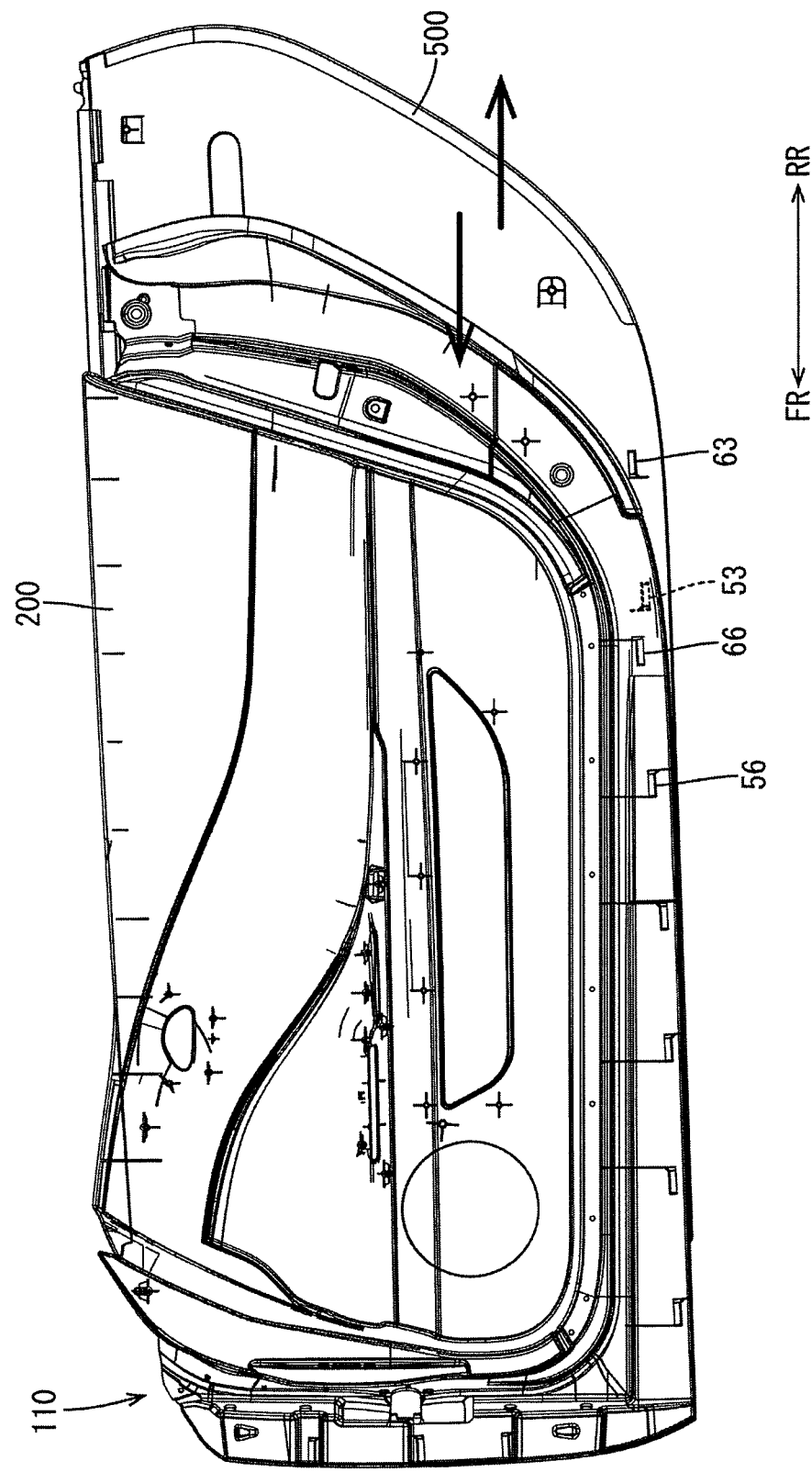
FIG. 9 is a plan view illustrating the vehicular door including the outer panel that is to be attached to and detached from the inner panel.

In this embodiment, as described before, the inner panel 200 that is connected to the outer panel 500 is mounted to the vehicular body 700 via a hinge portion 110. Accordingly, the vehicular door 100 is moved with swinging with respect to the vehicular body 700 to be closed and opened. The outer panel 500 can be detached from the inner panel 200 that is mounted to the vehicular body 700 by sliding the outer panel 500 with respect to the inner panel 200. Specifically, as illustrated in FIG. 9, the outer panel 500 that is connected to the inner panel 200 is slid to be away from the hinge portion 110 and pulled and removed from the inner panel 200 through an opposite side (the rear side) from the hinge portion 110 (see an arrow facing right in FIG. 9). The outer panel 500, which is a separated component, is put in the inner panel 200 from the opposite side (the rear side) from the hinge portion 110 and slid to be closer to the hinge portion 110 until the outer panel 500 and the inner panel 200 overlap each other (see an arrow facing left in FIG. 9). Thus, the outer panel 500 and the inner panel 200 are mounted to each other.

Figure 6:
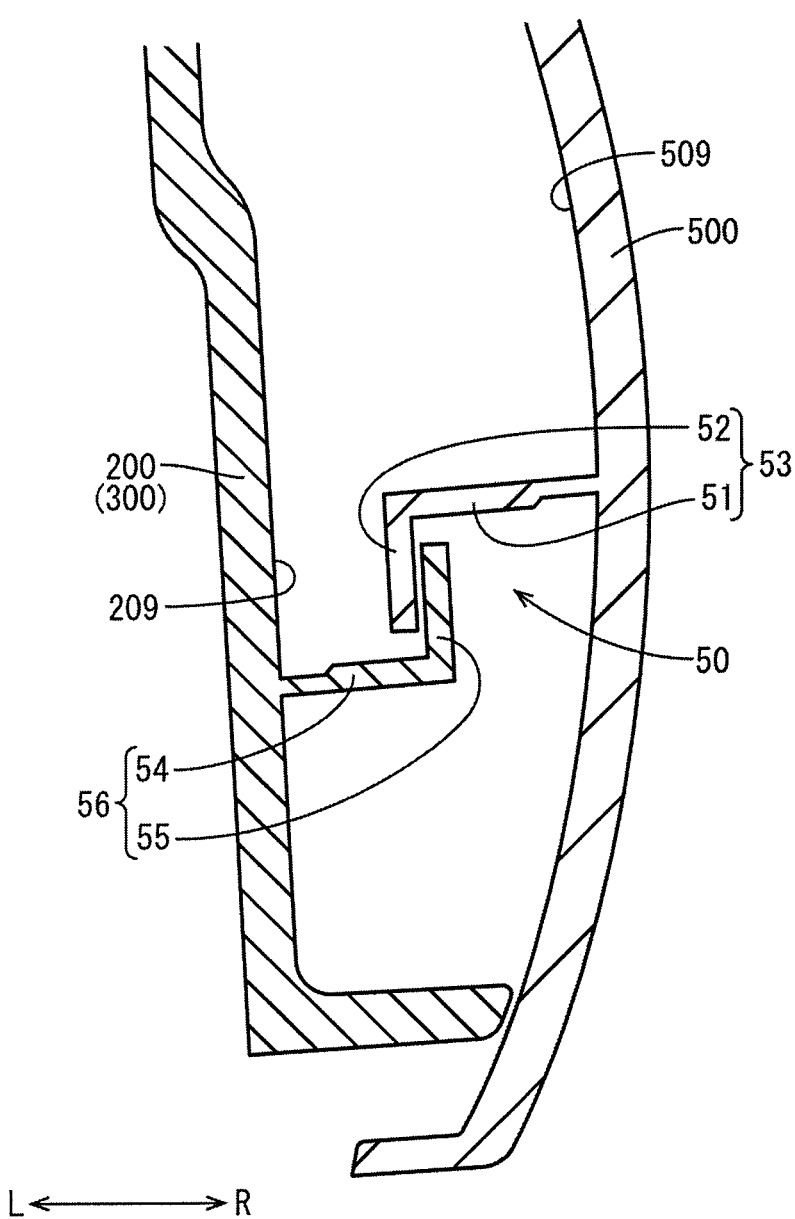
FIG. 6 is a cross-sectional view illustrating a mounting structure of the outer panel and the inner panel and taken along C-C line in FIG. 1 (FIG. 3).
Figure 7:
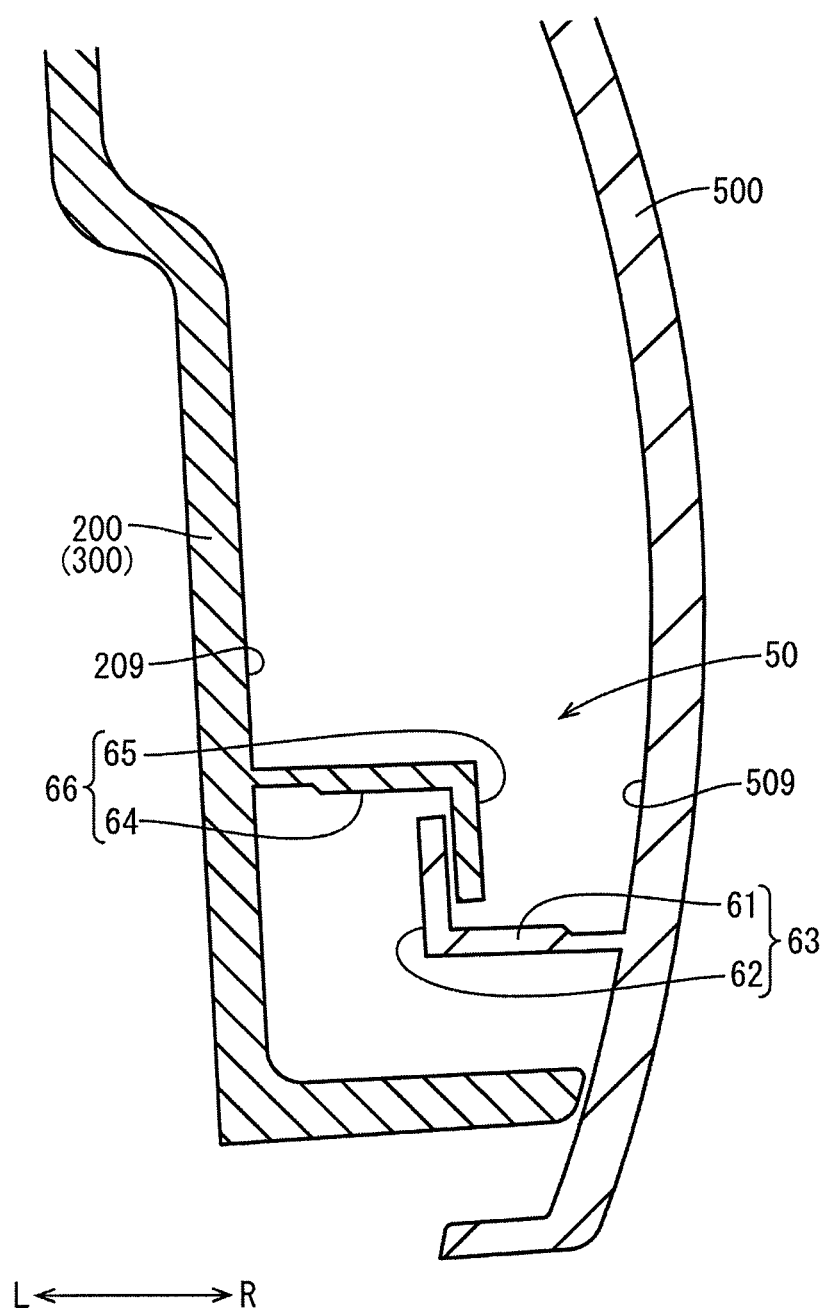
FIG. 7 is a cross-sectional view illustrating the mounting structure of the outer panel and the inner panel and taken along D-D line in FIG. 1 (FIG. 3).

One of the outer side stoppers included in the outer panel 500 is a first outer side stopper 53 that is relatively closer to the hinge portion 110. As illustrated in FIG. 6, the first outer side stopper 53 includes a first outer side projecting portion 51 projecting from the interior surface (the interior panel surface) 509 of the outer panel 500 and a second outer side projecting portion 52 projecting downward from a distal end of the first outer side projecting portion 51. Another one of the outer side stoppers included in the outer panel 500 is a second outer side stopper 63 that is relatively farther away from the hinge portion 110. As illustrated in FIG. 7, the second outer side stopper 63 includes a third outer side projecting portion 61 projecting from the interior surface (the interior panel surface) 509 of the outer panel 500 and a fourth outer side projecting portion 62 projecting upward from a distal end of the third outer side projecting portion 61.

One of the inner side stoppers included in the inner panel 200 is a first inner side stopper 56 that is relatively closer to the hinge portion 110. As illustrated in FIG. 6, the first inner side stopper 56 includes a first inner side projecting portion 54 projecting from the exterior surface (the exterior panel surface) 209 of the inner panel 200 and a second inner side projecting portion 55 projecting upward from a distal end of the first inner side projecting portion 54. Another one of the inner side stoppers included in the inner panel 200 is a second inner side stopper 66 that is relatively farther away from the hinge portion 110. As illustrated in FIG. 7, the second inner side stopper 66 includes a third inner side projecting portion 64 projecting from the exterior surface (the exterior panel surface) 209 of the inner panel 200 and a fourth inner side projecting portion 65 projecting downward from a distal end of the third inner side projecting portion 64.

The stopper 50 that is relatively close to the hinge portion 110 includes the first outer side stopper 53 and the first inner side stopper 56. The first outer side stopper 53 and the first inner side stopper 56 are fit to each other as follows. As illustrated in FIG. 6, the first outer side projecting portion 51 is on an upper side with respect to the first inner side projecting portion 54. The second outer side projecting portion 52 and the second inner side projecting portion 55 at least partially overlap each other with respect to the vehicular interior-exterior direction and the second outer side projecting portion 52 is on the vehicular interior side than the second inner side projecting portion 55. The stopper 50 that is relatively farther away from the hinge portion 110 includes the second outer side stopper 63 and the second inner side stopper 66. The second outer side stopper 63 and the second inner side stopper 66 are fit to each other as follows. As illustrated in FIG. 7, the third outer side projecting portion 61 is on a lower side with respect to the third inner side projecting portion 64. The fourth outer side projecting portion 62 and the fourth inner side projecting portion 65 at least partially overlap each other with respect to the vehicular interior-exterior direction and the fourth outer side projecting portion 62 is on the vehicular interior side than the fourth inner side projecting portion 65.

Figure 8:
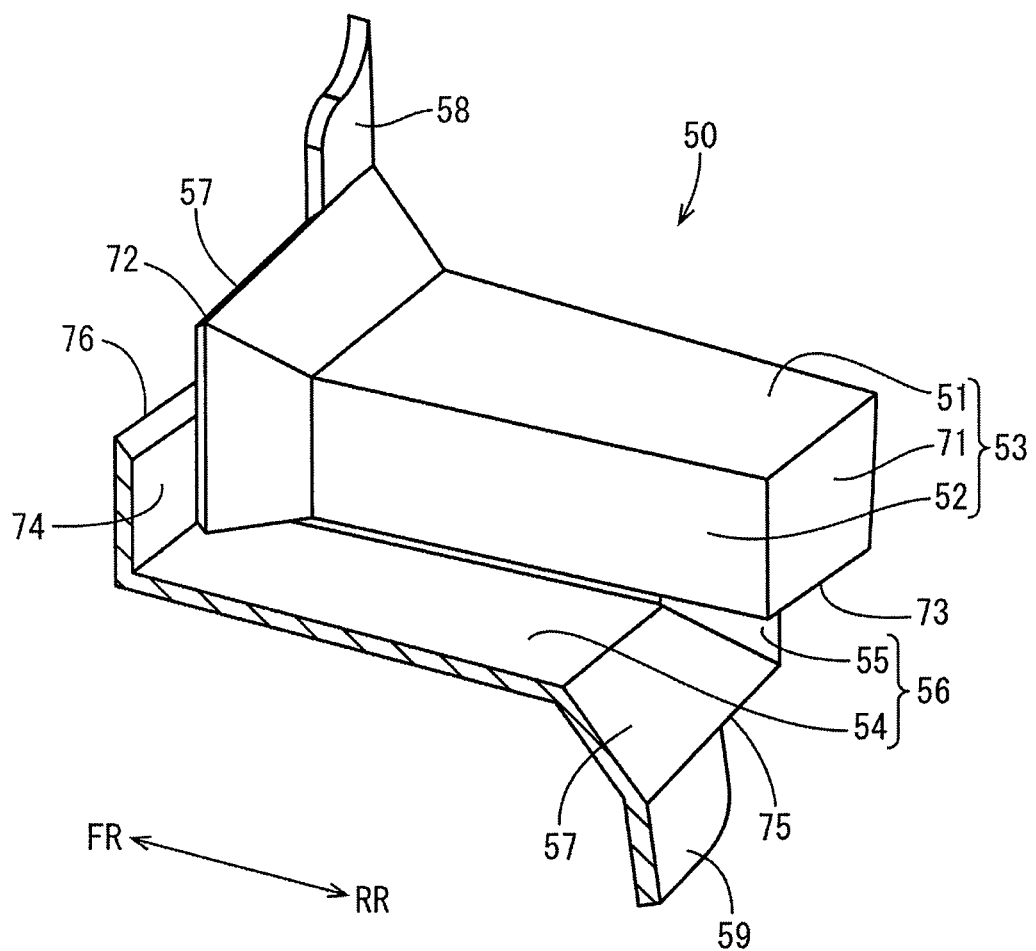
FIG. 8 is a perspective view illustrating the mounting structure of the outer panel and the inner panel including stoppers that are fitted to each other.

Each of the first outer side stopper 53 (the first outer side projecting portion 51, the second outer side projecting portion 52), the second outer side stopper 63 (the third outer side projecting portion 61, the fourth outer side projecting portion 62), the first inner side stopper 56, (the first inner side projecting portion 54, the second inner side projecting portion 55), and the second inner side stopper 66 (the third inner side projecting portion 64, the fourth inner side projecting portion 65) included in the stoppers 50 is a cantilever projection piece having a certain length elongated in the vehicular front-rear direction as illustrated in FIG. 8. A configuration of each stopper 50 will be described with reference to FIG. 8.

The first outer side stopper 53 includes an outer side rear portion 71 of a plate member surrounded by the outer panel 500 and vehicular rear edge sides of the first outer side projecting portion 51 and the second outer side projecting portion 52. The first outer side stopper 53 further includes an outer side first insertion hole 72 that is opposite the outer side rear portion 71 and at vehicular front edges of the first outer side projecting portion 51 and the second outer side projecting portion 52. The first outer side stopper 53 further includes an outer side second insertion hole 73 at lower edges of the second outer side projecting portion 52 and the outer side rear portion 71. The first outer side stopper 53 further includes a reinforcing rib 58 for reinforcing the projected portion. The reinforcing rib 58 extends from the outer side first insertion hole 72 side edge of the first outer side projecting portion 51 and from the outer panel 500. The first outer side stopper 53 has a guide surface 57 on an edge surface thereof near the outer side first insertion hole 72 for smooth fitting of the projections with sliding. The guide surface 57 is sloped to increase an opening size of the outer side first insertion hole 72. The outer side first insertion hole 72 through which the second inner side projecting portion 55 is to be inserted is included at the edge of the first outer side stopper 53 near the hinge portion 110.

The first inner side stopper 56 includes an inner side front portion 74 of a plate member surrounded by the inner panel 200 and vehicular front edge sides of the first inner side projecting portion 54 and the second inner side projecting portion 55. The first inner side stopper 56 further includes an inner side first insertion hole 75 that is opposite the inner side front portion 74 and at vehicular rear edges of the first inner side projecting portion 54 and the second inner side projecting portion 55. The first inner side stopper 56 further includes an inner side second insertion hole 76 at upper edges of the second inner side projecting portion 55 and the inner side front portion 74. The first inner side stopper 56 further includes a reinforcing rib 59 for reinforcing the projected portion. The reinforcing rib 59 extends from the inner side first insertion hole 75 side edge of the first inner side projecting portion 54 and from the inner panel 200. The first inner side stopper 56 has a guide surface 57 on an edge surface thereof near the inner side first insertion hole 75 for smooth fitting of the projections with sliding. The guide surface 57 is sloped to increase an opening size of the inner side first insertion hole 75. The inner side first insertion hole 75 through which the second outer side projecting portion 52 is to be inserted is included at the edge of the first outer side stopper 53 far from the hinge portion 110.

According to such a configuration, the first outer side stopper 53 and the first inner side stopper 56 overlap and are stopped with respect to a vertical direction and the vehicular interior-exterior direction and the second outer side stopper 63 and the second inner side stopper 66 overlap and are stopped with respect to the vertical direction and the vehicular interior-exterior direction. Such stopper structures are provided along the outer edge of the vehicular door 100 so that the outer panel 500 and the inner panel 200 are connected to each other. According to such a configuration, the outer panel 500 and the inner panel 200 are mounted to each other while being positioned with respect to the vertical direction and the vehicular interior-exterior direction.

As illustrated in FIG. 5, the stoppers 50 are arranged in a direction away from the hinge portion 110 such that the inner panel 200 and the outer panel 500 are slidably and detachably moved in a relatively lateral direction along a panel surface (in the vehicular front-rear direction). Namely, the stoppers 50 are arranged such that the stoppers are not contacted and obstruct the sliding when the outer panel 500 is detached from or mounted in the inner panel 200 with sliding. In mounting the outer panel 500 to the inner panel 200, the outer panel 500 is fit into the inner panel 200 from the vehicular rear side of the inner panel 200 and moved laterally with sliding. At this time, the second inner side projecting portion 55 is inserted through the outer side first insertion hole 72 to an inner space of the first outer side stopper 53 and the second outer projecting portion overlaps the second inner side projecting portion 55 with respect to the vehicular interior-exterior direction. A front edge of the first outer side stopper 53 is contacted with the inner side front portion 74 or a rear edge of the first inner side stopper 56 is contacted with the outer side rear portion 71 such that the outer panel 500 is not unnecessarily inserted further toward the vehicular front side.

The first outer side stopper 53 is closer to the hinge portion 110 than the second outer side stopper 63 and the first inner side stopper 56 is closer to the hinge portion 110 than the second inner side stopper 66. When the outer panel 500 is moved in the vehicular front-rear direction along the panel surface to be detached from or mounted in the inner panel 200, the second inner side stopper 66 is disposed at a level so as not to be contacted with the first outer side stopper 53. According to such a configuration, the stoppers are not contacted in the sliding and the outer panel 500 is detached from or mounted in the inner panel 200 smoothly. Namely, the outer side stoppers 53, 63 and the inner side stoppers 56, 66 are arranged such that respective levels of the outer side stoppers 53, 63 are different from respective levels of the inner side stoppers 56, 66. The outer side stoppers 53, 63 that are arranged in the vehicular front-rear direction are arranged at different levels in a direction (a vertical direction) perpendicular to the vehicular front-rear direction (a sliding direction), and the inner side stoppers 56, 66 that are arranged in the vehicular front-rear direction are arranged at different levels in the direction (the vertical direction) perpendicular to the vehicular front-rear direction (the sliding direction).

Each of the outer side stoppers 53, 63 includes a reinforcing rib 58 and each of the inner side stoppers 56, 66 includes the reinforcing rib 59 for reinforcing the projecting portions. As illustrated in FIG. 8, each stopper has the guide surface 57 at an opening end thereof for achieving smooth sliding.

As illustrated in FIG. 4, the window glass 30 (a window component, a functional component) is included in the vehicular door 100 according to this embodiment. The door 100 including the window glass 30 has a function of a window. The window glass 30 is between the outer panel 500 and the inner panel 200, as described before. As illustrated in FIG. 14, a window regulator with a motor 31 is mounted between the outer panel 500 and the inner panel 200, and specifically, is mounted on the body member 300 of the inner panel 200. The window regulator 31, which is a driving component, drives the window glass 30, which is the functional component, to move the window glass 30 up and down. The switches 14 are arranged on the design surface of the inner panel 200 for operating the window regulator with a motor 31 to lift or lower the window glass 30 vertically.

As illustrated in FIG. 14, the switch base 32 is disposed in an upper surface 312 of the projected section 311 of the body member 300 of the inner panel 200. The switch base 32 includes the switches 14 that are exposed from the upper surface 312 toward the interior design surface side. The switch base 32 includes the switches 14 exposed from the upper surface of the projected section 311, a base portion 33 extending downward from the upper surface, and a mounting seat 34 extending from the base portion 33 toward the exterior side. The window regulator with a motor 31 is mounted in the mounting seat 34. The window regulator with a motor 31 is arranged on the exterior surface side with respect to the inner panel 200 (the body member 300) and, specifically, is mounted in the mounting seat 34 that is included in the switch base 32 having the switches 14 and extends toward the exterior side. According to such a configuration, wiring between the switches 14 and the window regulator with a motor 31 is easy and simple.

Figure 15:
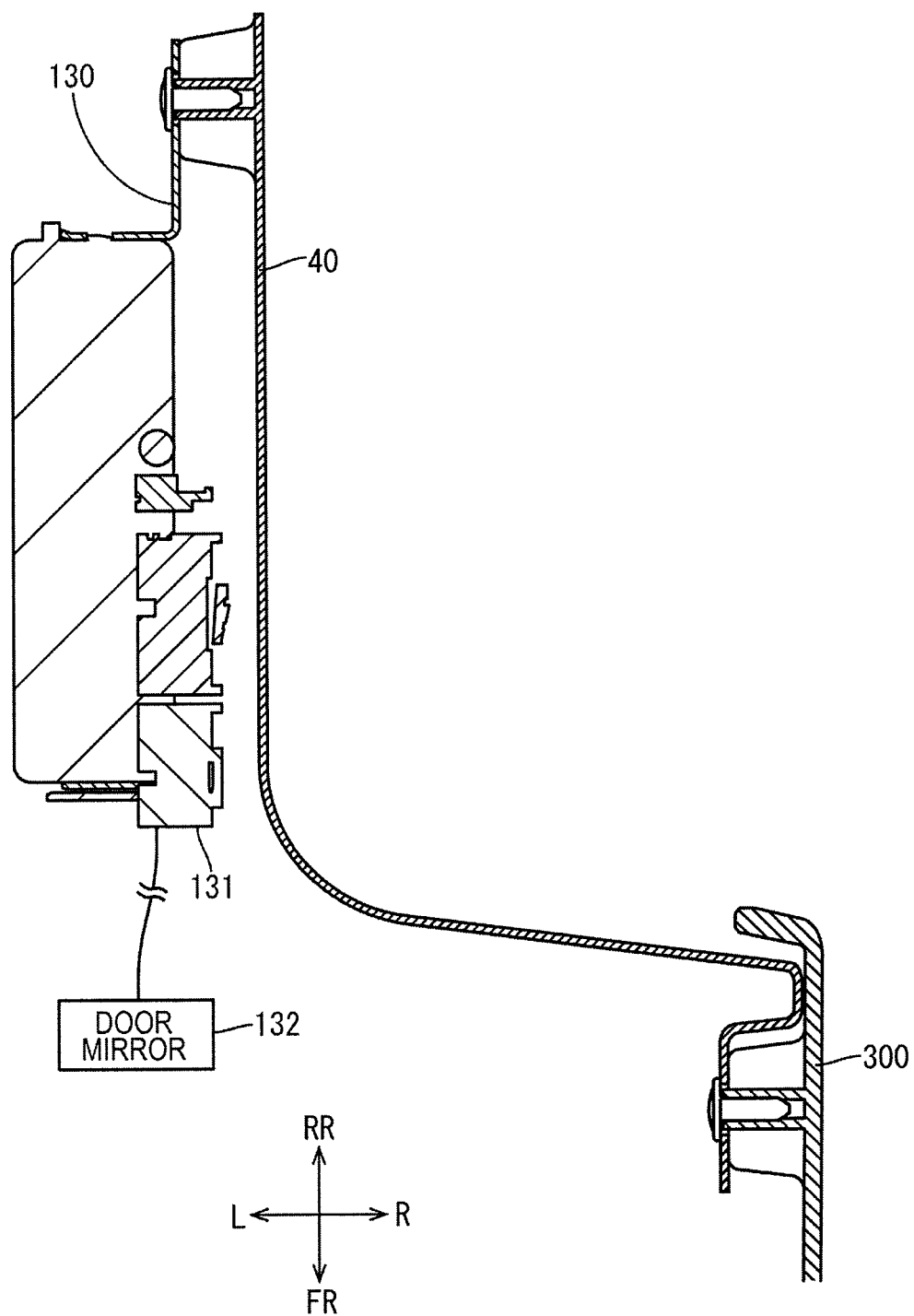
FIG. 15 is a cross-sectional view illustrating a portion of the vehicular door near a mirror controller according to the first embodiment and taken along H-H line.

As a functional component different from the window glass (the window component) 30, as illustrated in FIG. 15, a door mirror 132 is included in the door and a mirror controller ECU 131 for driving the door mirror 132 is mounted in the inner panel 200 (the body member 300). Specifically, the mirror controller ECU 131 is disposed on the exterior surface side with respect to the cover member 40 that covers the pocket hole 15. The mirror controller ECU 131 is mounted on a mounting seat 130 extending toward the vehicular exterior side. Signal lines extend from the mirror controller ECU 131 to the switches 14 and the door mirror 132 is opened or closed and the angle of the door mirror 132 is adjusted by operating the switches 14.

Figure 16:
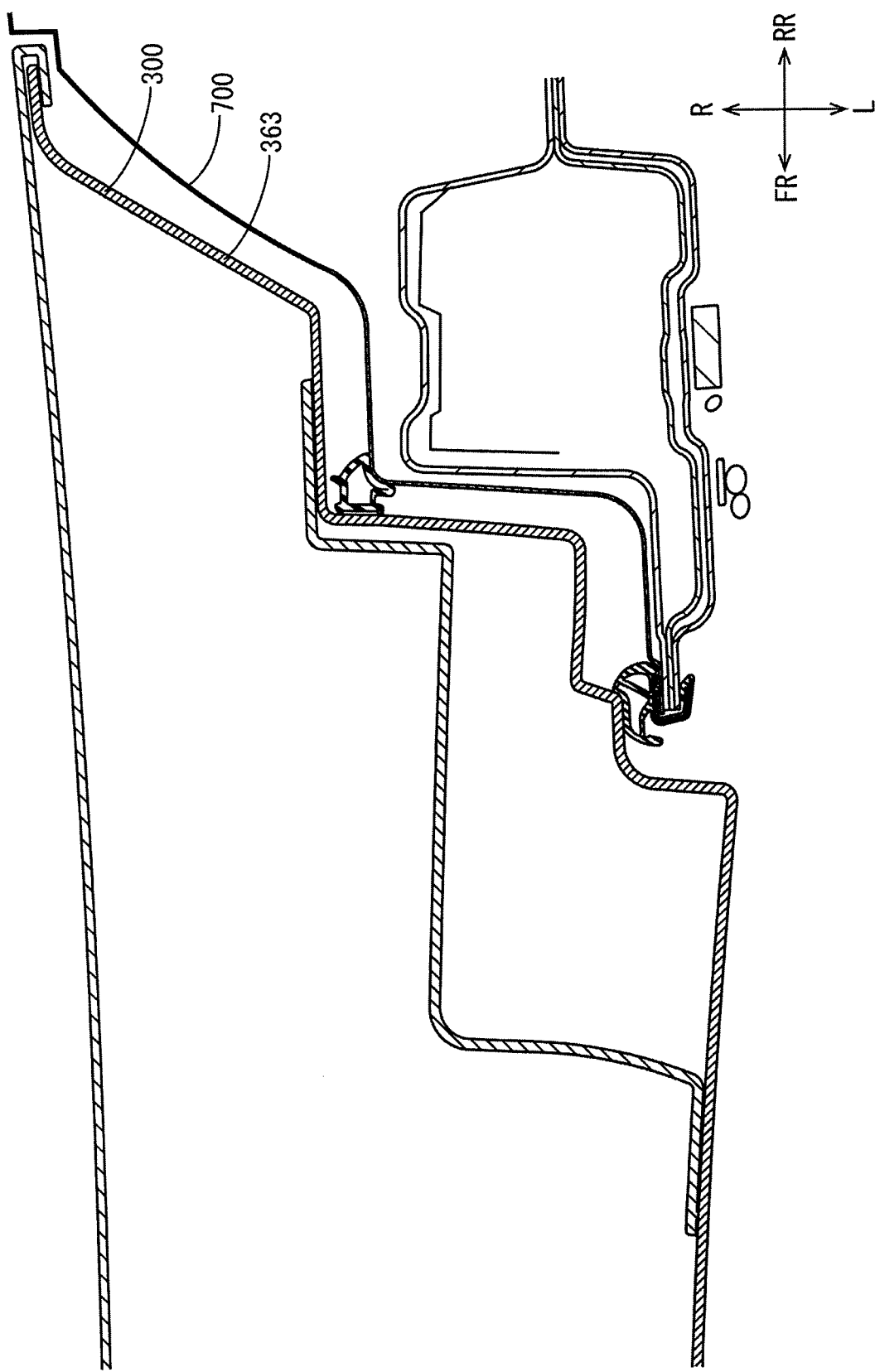
FIG. 16 is a cross-sectional view illustrating a portion of the vehicular door near a locking mechanism according to the first embodiment and taken along I-I line.

If the vehicular door 100 that is closed such that a part of the vehicular door 100 overlaps the vehicular body 700 as illustrated in FIG. 16 is moved around the hinge portion 110 and opened, a rear side surface (a rear wall surface) 363 of the vehicular door 100 is exposed rearward. The vehicular door 100 is formed of combination of the outer panel 500 made of resin and the inner panel 200 made of resin. The rear side surface 363 is formed from the body member 300 made of resin and may be seen from the rear side by somebody when the door is open. The rear side surface 363 may be molded with resin such as embossing and may be processed to be an embossed surface having improved design.

Figure 17:
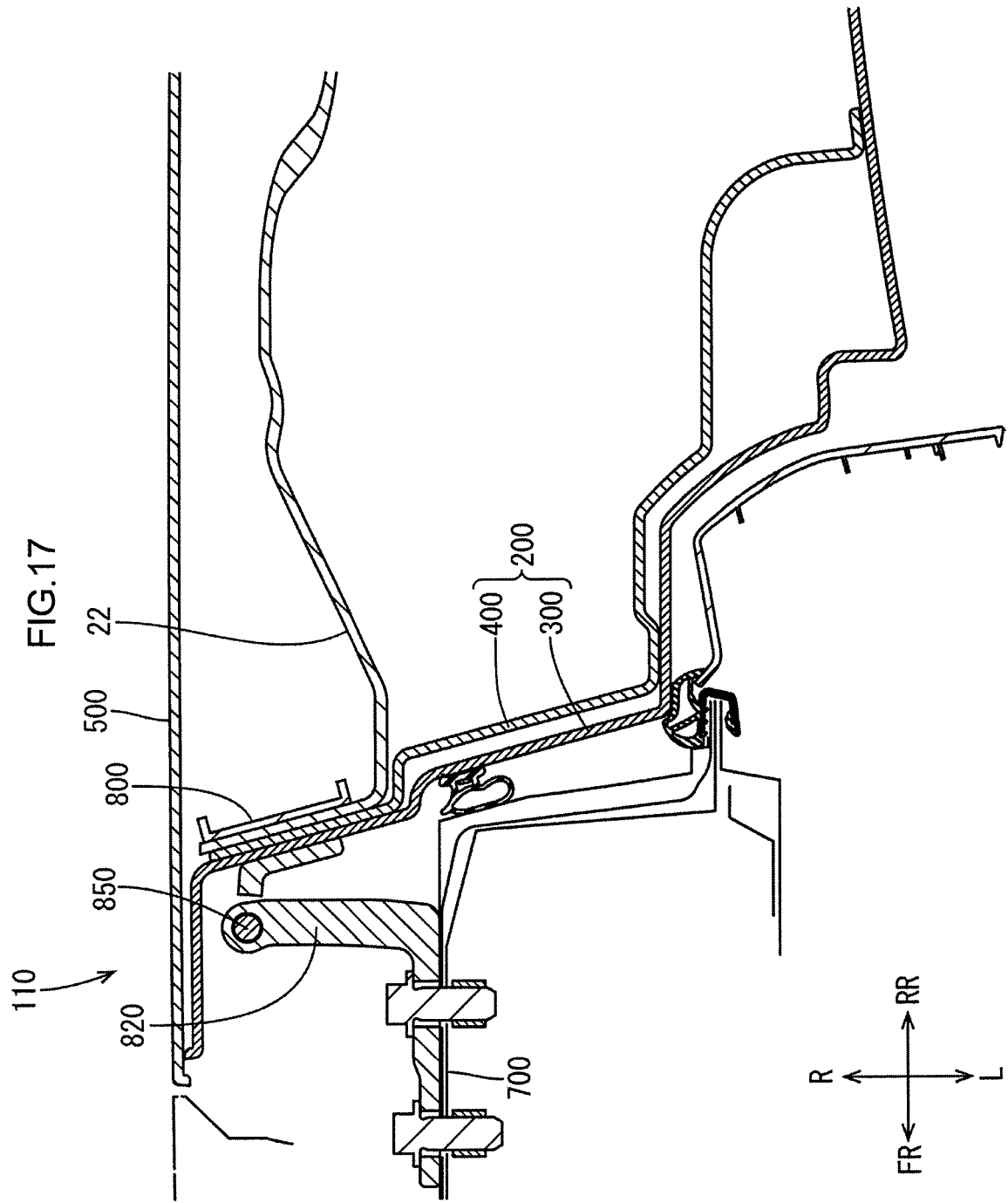
FIG. 17 is a cross-sectional view illustrating a portion of the vehicular door near a hinge portion according to the first embodiment and taken along J-J line.
Figure 18:
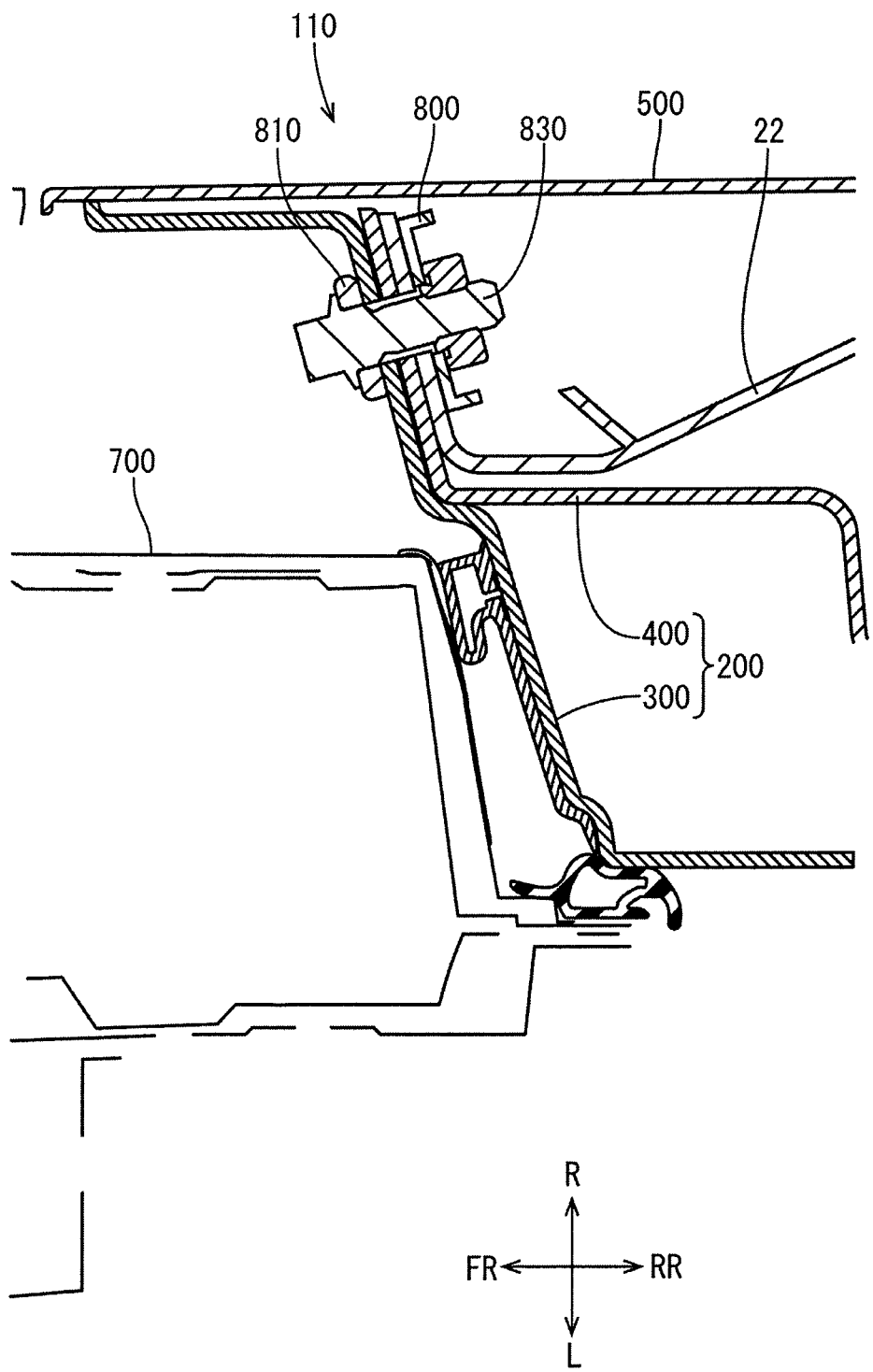
FIG. 18 is a cross-sectional view illustrating a portion of the vehicular door near the hinge portion according to the first embodiment and taken along K-K line.

A configuration of the hinge portion 110 with which the vehicular door 100 is opened and closed will be described with reference to FIGS. 17 and 18.

As described before, the vehicular door 100 includes the inner panel 200 and the outer panel 500 and the inner panel 200 is connected to the vehicular body 700 via the hinge portion 110. The force is concentrated on the hinge portion 110 when the door is opened and closed and therefore, the hinge portion 110 is necessary to be mounted on the inner panel 200 with great connection strength. In this embodiment, the body member 300 and the reinforcing member 400 included in the inner panel 200 and the outer reinforcing member 22 are fastened with the hinge portion 110. Specifically, as illustrated in FIGS. 17 and 18, the inner panel 200, which includes the body member 300 and the reinforcing member 400, and the outer reinforcing member 22 are supported by a hinge plate 800 from outside and fastened with a screw 830 from inside while having one hinge bracket 810 of the hinge portion 110 therebetween. Namely, the inner panel 200, the outer reinforcing member 22, the hinge plate 800, and the hinge bracket 810 are fastened with the screw 830. As illustrated in FIG. 18, another hinge bracket 820 is supported by the vehicular body 700 via a rotation center 850 and according to such a configuration, the vehicular door 100 (the inner panel 200) is moved with swinging and opened and closed with respect to the vehicular body 700. As illustrated in FIGS. 17 and 18, the outer panel 500 is mounted to the inner panel 200 to cover the hinge portion 110 and the inner panel 200 from outside and slides laterally with respect to the inner panel 200 to be detached from and attached to the inner panel 200.

The vehicular door 100 according to the first embodiment includes the outer panel 500 made of resin and the inner panel 200 that is made of resin and mounted to the outer panel 500 on the vehicular interior side with respect to the outer panel 500. The inner panel 200 includes the body member 300 made of resin and configuring the interior design surface of the vehicular door 100 and the reinforcing member 400 made of resin and disposed on the exterior side with respect to the body member 300 and opposite the outer peripheral portion of the body member 300. The outer member and the inner member of the door are made of resin and thus, the door is reduced in weight. The resin inner panel 200, which is the inner member, includes the resin body member 300 as the design surface of the vehicular interior and includes the resin reinforcing member 400 at the exterior outer peripheral portion of the resin body member 300 to strengthen the outer peripheral portion of the door. Thus, effective rigidity of the door is ensured with a simple configuration and a low cost. Especially, the resin inner panel 200 is formed from two components including the body member 300 as a design component and the reinforcing member 400 as a reinforcing component. Such a configuration provides quite a new vehicular door. The inner panel 200 is simply produced by bonding the frame-shaped reinforcing member 400 to the external outer peripheral surface of the body member 300 with adhesive and the obtained inner panel 200 is mounted on the outer panel 500 and the vehicular door 100 is produced.

The resin reinforcing member 400 includes the upper bent section 403 and the lower bent section 407 that are plate members bent and projecting toward the outer panel 500 and the first space 425A and the second space 425B are formed between the respective upper and lower bent sections 403, 407 and the resin body member 300 with respect to the vehicular interior-exterior direction. According to such a configuration, the first and second spaces 425A, 425B that are between the respective bent sections 403, 407 and the resin body member 300 ensure high rigidity. Therefore, the vehicular door 100 including the outer panel 500 and the inner panel 200 that are made of resin can have effective rigidity. Especially, the first space 425A and the second space 425B are formed between the resin outer panel 500 and the resin body member 300 of the resin inner panel 200. Therefore, no component is therebetween and a large space area can be provided within the respective spaces 425A, 425B and the high rigidity can be obtained easily.

The resin body member 300 includes the upper panel section 301 on the upper side and the lower panel section 302 on the lower side. The upper panel section 301 extends in the vehicular front-rear direction and is curved toward the vehicular exterior side as it extends from the middle section 331 with respect to the vertical direction toward the upper section 332 thereof. The lower panel section 302 extends in the vehicular front-rear direction and is curved toward the vehicular exterior side as it extends from the middle section 333 with respect to the vertical direction toward the lower section 334 thereof. The resin reinforcing member 400 includes the upper bent section 403 that forms the first space 425A with the external surface of the upper panel section 301 therebetween and the lower bent section 407 that forms the second space 425B with the external surface of the lower panel section 302 therebetween. According to such a configuration, the upper portion of the vehicular door 100 has high rigidity at the first space 425A that is between the upper panel section 301 and the upper bent section 403, and the lower portion of the vehicular door 100 has high rigidity at the second space 425B that is between the lower panel section 302 and the lower bent section 407. Therefore, the vehicular door 100 including the outer panel 500 and the inner panel 200 that are made of resin can have effective rigidity.

The resin reinforcing member 400 is formed in an annular shape along the peripheral portion of the resin body member 300. According to such a configuration, the inner panel 200, that is eventually the vehicular door 100, can have higher rigidity.

The resin body member 300 includes the projected section 311 that projects toward the vehicular interior side. The switches 14 or the switch base 32, which are functional components providing a function to the vehicular door 100, is mounted in the projected section 311. The vehicular door 100 needs to have rigidity at the portion in which the functional component is mounted. In the above configuration, the projected section 311 has higher rigidity than other flat portion of the resin body member 300. The switches 14 and the switch base 32, which are the functional components, are mounted in the projected section 311 having higher rigidity and therefore, even if the functional components is mounted in the resin inner panel 200, problems regarding the rigidity are less likely to be caused.

The outer reinforcing member 22 that is formed of resin or combination of resin and fiber material and extends in the vehicular front-rear direction is arranged on the vehicular interior side with respect to the resin outer panel 500 and opposite the upper section of the resin outer panel 500. According to such a configuration, the resin outer panel 500 can have effective strength.

The window glass 30, which is formed from a plate member of the door window, is between the resin outer panel 500 and the resin inner panel 200 so as to be movable upward and downward. The weather strip (the buffer member) 35 is mounted on the exterior side surface of the upper section 401 of the resin reinforcing member 400 (the exterior side surface of the mounting seat portion 402) to close the space between the exterior side surface of the upper section 401 and the window glass 30, which is formed from the plate member, and allow the window glass 30 to be lifted and lowered. According to such a configuration, a space near the window is closed and the window glass 30 can be lifted and lowered without additionally including another mounting member for mounting the weather strip (the buffer member) 35. In this embodiment, the resin reinforcing member 400 includes the upper bent section 403 formed of resin and the angle of the upper bent section 403 can be easily adjusted. Therefore, the position and the angle of the weather strip (the buffer member) 35 can be changed freely by adjusting the angle of the upper bent section 403. As a result, friction between the weather strip (the buffer member) 35 and the window glass 30 (the plate member) can be adjusted appropriately.

The impact beam 21 is mounted on the vehicular interior side of the resin outer panel 500 at the lower section thereof. The impact beam 21 extends in the vehicular front-rear direction and absorbs shock from the vehicular exterior side. The resin reinforcing member 400 includes the lower bent section 407 (the impact beam opposite bent section) that overlaps and is opposite the impact beam 21 with respect to the vehicular interior-exterior direction. The lower bent section 407 (the impact beam opposite bent section) is formed from a plate member that is bent to project toward the resin outer panel 500. According to such a configuration, the second space 425B (the impact beam overlapping space) is surrounded by the lower bent section 407 (the impact beam opposite bent section) and the resin body member 300. According to such a configuration, the impact from the vehicular exterior side can be absorbed by two components including the impact beam 21 and the second space 425B (the impact beams overlapping space) overlapping the impact beam 21. Therefore, the vehicular door 100 including the resin outer panel 500 and the resin inner panel 200 can appropriately protect the occupants from the shock.

The resin body member 300 has the pocket opening 11 (an opening, a hole). The lower edge of the projected section 311 of the body member 300 and the inner edge of the lower section 404 of the reinforcing member 400 has the pocket hole 15 therebetween. The cover member 40 is disposed to cover the pocket hole 15 from the exterior side with respect to the body member 300 and the reinforcing member 400. Thus, the door pocket 10 has an inner space surrounded by the lower portion of the body member 300 below the pocket opening 11 and the cover member 40. According to such a configuration, a small luggage can be put in the door pocket 10 through the pocket opening 11 (the opening, the hole) from the vehicular interior side. The pocket hole 15 that is between the resin reinforcing member 400 and the body member 300 is covered with the cover member 40 from the vehicular exterior side and thus, the door pocket 10 is provided. In such a configuration, any additional component is not required to form the door pocket 10 and a cost is lowered.

The resin reinforcing member 400 includes the rear wall 445 extending from the interior surface of the rear portion of the reinforcing member 400 with respect to the vehicular front-rear direction to the exterior surface of the body member 300 and the upper wall 446 extending from the interior surface of the upper portion of the reinforcing member 400 to the exterior surface of the body member 300. The rear wall 445 includes the locking mechanism 460 for locking the vehicular door 100 with the vehicle body and the locking mechanism mounting portion 445A and the locking mechanism housing portion 461 of the locking mechanism 460 are configured to have thickness greater than that of the upper wall 446. When the door is locked, a locking portion of the door that is to be locked with the vehicle body and includes the locking mechanism 460 is required to have strength relatively greater than other portion of the door. According to the above configuration, the resin reinforcing member 400 includes the locking mechanism 460 at the rear wall 445 and the locking mechanism mounting portion 445A and the locking mechanism housing portion 461 of the locking mechanism 460 is configured to be thicker than other portion (the upper wall in this embodiment) such that the strength of the locking portion is ensured.

The outer panel 500 includes the first outer side stopper 53 and the second outer side stopper 63. The first outer side stopper 53 includes the first outer side projecting portion 51 projecting from the interior panel surface 509 of the outer panel 500 and the second outer side projecting portion 52 projecting downward from the first outer side projecting portion 51. The second outer side stopper 63 includes the third outer side projecting portion 61 projecting from the interior panel surface 509 of the outer panel 500 and the fourth outer side projecting portion 62 projecting upward from the third outer side projecting portion 61. The inner panel 200 includes the first inner side stopper 56 and the second inner side stopper 66. The first inner side stopper 56 includes the first inner side projecting portion 54 projecting from the exterior panel surface 209 of the inner panel 200 and the second inner side projecting portion 55 projecting upward from the first inner side projecting portion 54. The second inner side stopper 66 includes the third inner side projecting portion 64 projecting from the exterior panel surface 209 of the inner panel 200 and the fourth inner side projecting portion 65 projecting downward from the third inner side projecting portion 64.

The first outer side stopper 53 and the first inner side stopper 56 are fitted to each other as follows. The first outer side projecting portion 51 is on an upper side with respect to the first inner side projecting portion 54. The second outer side projecting portion 52 and the second inner side projecting portion 55 at least partially overlap each other with respect to the vehicular interior-exterior direction and the second outer side projecting portion 52 is on the vehicular interior side than the second inner side projecting portion 55. The second outer side stopper 63 and the second inner side stopper 66 are fitted to each other as follows. The third outer side projecting portion 61 is on a lower side with respect to the third inner side projecting portion 64. The fourth outer side projecting portion 62 and the fourth inner side projecting portion 65 at least partially overlap each other with respect to the vehicular interior-exterior direction and the fourth outer side projecting portion 62 is on the vehicular interior side than the fourth inner side projecting portion 65.

According to such a configuration, the outer panel 500 and the inner panel 200 are mounted to each other by relatively sliding them in a lateral direction (in the vehicular front-rear direction) that is a mounting direction. The outer panel 500 and the inner panel 200 can be separated from each other by relatively sliding them in an opposite direction from the mounting direction. Thus, in the vehicular door 100, the outer panel 500 and the inner panel 200 are easily fit to each other and easily separated from each other, and any additional components for the fitting or separating such as screws is not necessary.

Each of the first outer side projecting portion 51, the second outer side projecting portion 52, the third outer side projecting portion 61, the fourth outer side projecting portion 62, the first inner side projecting portion 54, the second inner side projecting portion 55, the third inner side projecting portion 64, and the fourth inner side projecting portion 65 is a projection piece having a certain width. According to such a configuration, the outer panel 500 and the inner panel 200 are supported each other vertically and laterally with overlapping projections.

Among the outer panel 500 and the inner panel 200, only the inner panel 200 is fixed to the vehicular body 700 via the hinge portion 110 such that the vehicular door is opened and closed with swinging. The outer panel 500 is not connected to the vehicular body 700. Therefore, the outer panel 500 is easily removed from the inner panel 200 that is connected to the vehicular body 700 by sliding laterally the outer panel 500 to be away from the hinge portion 110. In mounting the outer panel 500 in the inner panel 200, the outer panel 500 can be easily mounted in the inner panel 200, which is connected to the vehicular body 700 with the hinge portion 110, by sliding the outer panel 500 into the inner panel 200 from the portion away from the hinge portion 110.

The first outer side stopper 53 and the second inner side stopper 66 are arranged at different levels so as not to be contacted with each other in the relative sliding of the inner panel 200 and the outer panel 500. The second outer side stopper 63 and the first inner side stopper 56 are arranged at different levels so as not to be contacted with each other in the relative sliding of the inner panel 200 and the outer panel 500. Accordingly, the inner panel 200 and the outer panel 500 can be smoothly mounted or removed by relatively sliding them laterally. In this embodiment, the first inner side stopper 56 is fit to the first outer side stopper 53 and the second inner side stopper 66 is fit to the second outer side stopper 63. If the first outer side stopper 53 contacts the second inner side stopper 66 in the sliding operation of the outer panel 500, the relative lateral sliding of the outer panel 500 and the inner panel 200 cannot be performed for mounting and removing the outer panel 500 and the inner panel 200. However, in this embodiment, the position relation is such that the first outer side stopper 53 does not contact the second inner side stopper 66 or the second outer side stopper 63 does not contact the first inner side stopper 56 in the sliding operation. Namely, the outer side stoppers are arranged at different levels from the inner side stoppers. Therefore, the outer panel 500 and the inner panel 200 are mounted and removed smoothly by the lateral sliding operation thereof.

Especially in this embodiment, only the inner panel 200 is connected to the vehicular body 700 via the hinge portion 110 such that the vehicular door is opened and closed with swinging. Namely, the outer panel 500 is not fixed to the vehicular body 700. The first outer side stopper 53 is closer to the hinge portion 110 than the second outer side stopper 63 is and the first inner side stopper 56 is closer to the hinge portion 110 than the second inner side stopper 66 is. Further, the second inner side stopper 66 is included in the inner panel 200 so as not to contact the first outer side stopper 53 when the outer panel 500 is moved (slid) laterally with respect to the inner panel 200 to be mounted in or removed from the inner panel 200. Namely, the first outer side stopper 53 and the second inner side stopper 66 are arranged at different height levels and the first inner side stopper 56 and the second outer side stopper 63 are arranged at different height levels. According to such a configuration, when the outer panel 500 is moved and slid laterally with respect to the inner panel 200, the inner side stoppers are not contacted with any of the outer side stoppers.

In this embodiment, when the outer panel 500 is mounted in the inner panel 200, the first inner side stopper 56 is fit to the first outer side stopper 53 and the second inner side stopper 66 is fit to the second outer side stopper 63. If the position relation is such that the outer side stopper contacts the inner side stopper in the sliding operation of the outer panel 500, the relative sliding of the outer panel 500 and the inner panel 200 in the lateral direction cannot be performed for mounting and removing the outer panel 500 and the inner panel 200. However, in this embodiment, the outer side stoppers and the inner side stoppers are arranged at different levels. Therefore, the first outer side stopper 53 that is closer to the hinge portion 110 and is to be inserted first at the time of the sliding insertion does not contact the second inner side stopper 66 that is arranged on the vehicular rear side in the sliding operation. Therefore, the first outer side stopper 53 closer to the hinge portion 110 does not contact the second inner side stopper 66 and the outer panel 500 and the inner panel 200 are mounted and removed smoothly by the lateral sliding operation thereof.

The vehicular door 100 according to this embodiment includes the window glass 30 (the window component) as the functional component that provides a function to the vehicular door 100, the window regulator with a motor 31 as the driving component for driving the window glass 30, and the switches 14 for operating the window regulator with a motor 31 to exert the function of the window glass 30. The switches 14 are arranged on the vehicular interior surface side of the inner panel 200 and the window regulator with a motor 31 is arranged on the vehicular exterior surface side of the inner panel 200. Among the outer panel 500 and the inner panel 200 of the door, the switches 14 are arranged on the interior surface side of the inner panel 200 that forms the vehicular interior design surface and the window regulator with a motor 31 is arranged on the exterior surface side of the inner panel 200. Therefore, the arrangement configuration of the switches 14 and the window regulator 31 is simple and a space for them can be smaller. In the door including the inner panel 200 configuring the interior design surface and the outer panel 500, another panel is not provided for mounting the window regulator with a motor 31. However, the window regulator with a motor 31 is mounted on the inner panel 200 including the switches 14 such that the configuration of the door is simple.

The mounting seat 34 is provided on the inner panel 200 so as to extend from the exterior surface of the inner panel 200 toward the exterior side. The window regulator with a motor 31 is mounted on the mounting seat 34. Thus, the window regulator with a motor 31 is mounted on the inner panel 200 via the mounting seat 34 extending toward the exterior side. Accordingly, the window regulator with a motor 31 can be arranged in an appropriate position between the inner panel 200 and the outer panel 500.

The window regulator with a motor 31, which is the driving component, is mounted on the body member 300 made of resin. In the vehicular door 100 including the outer panel 500 and the inner panel 200 that are made of resin, rigidity of the door 100 can be ensured by the reinforcing member 400 made of resin. Furthermore, the window regulator with a motor 31 is mounted on the body member 300 made of resin and the rigidity is increased at the mounting portion of the body member 300. The window regulator with a motor 31, which is the driving component, is mounted on the body member 300 of the inner panel 200 that is fixed to the vehicular body 700 with the hinge portion 110. With such a configuration, in removing the outer panel 500 from the inner panel 200, the lines routed between the window glass 30 (the functional component), the window regulator with a motor 31 (the driving component), and the switches 14 are not necessary to be removed.

The inner panel 200 (the body member 300) includes the projected section 311 that projects toward the vehicular interior side. The switches 14 are included in the switch base 32 that is arranged on the upper surface 312 of the projected section 311 of the inner panel 200 (the body member 300). The switch base 32 includes the switches 14 that are exposed at the upper surface of the projected section 311, the base portion 33 extending downward from the upper surface, and the mounting seat 34 extending from the base portion 33 toward the exterior side and on which the window regulator 31 is mounted. Among the outer panel 500 and the inner panel 200 of the door, the switches 14 are arranged on the interior surface side of the inner panel 200 that forms the interior design surface and the window regulator with a motor 31 is arranged on the exterior surface side of the inner panel 200. Therefore, the arrangement configuration of the switches 14 and the window regulator 31 is simple and a space for them can be smaller. Especially, the switch base 32 is mounted in the projected section 311 of the inner panel 200 (the body member 300) and includes the base portion 33 extending downward from the upper surface of the projected section 311 and the mounting seat 34 extending from the base portion 33 toward the exterior side and in which the window regulator 31 is mounted.

Next, a configuration of a vehicular door according to a second embodiment will be described with reference to FIG. 19. Unlike the reinforcing member 400 of the first embodiment, the vehicular door according to the second embodiment includes a reinforcing member 4000 having a configuration illustrated in FIG. 19. Specifically, the reinforcing member 4000 integrally includes the cover member 40 that extends upward from a lower end pf the reinforcing member 4000. An upper end (distal end) of the cover member 40 contacts the lower edge of the projected section 311 of the body member 300 and a housing space is formed within the door pocket 10. The locking mechanism 460 is also molded integrally with the reinforcing member 4000. Other configurations are similar to those of the first embodiment and will not be described.

The present technology is not limited to the description as described above with reference to the drawings. For example, the present technology may include following embodiments.

In the above embodiments, automobiles are described as an example of the vehicle. Other than that, the vehicular door of the present technology may be applied to vehicles on the ground such as a train or amusement park ride, flying vehicles such as an airplane or a helicopter, and marine vehicles or undersea vehicles such as a ship or a submarine.

In the above embodiments, the configuration of the vehicular door of the technology described herein is applied to a front door. However, the configuration of the vehicular door of the technology described herein may be applied to a back door.

In the above embodiments, the reinforcing member 400, 4000 is formed in a frame shape. However, the reinforcing member 400, 4000 is necessarily disposed on an exterior side peripheral portion of the body member 300 to configure the reinforcing structure. For example, the reinforcing member 400, 4000 may be configured as follows to reinforce the body member and increase rigidity of the inner panel 200. One or multiple reinforcing member(s) may be partially provided on any portion of the peripheral portion of the body member, or the reinforcing member may be provided along an upper side section or a lower side section of the peripheral portion of the body member or may extend from the upper side section to a side section or may be provided partially along the periphery of the body member. In the present embodiment also, the first and second spaces 425A, 425B extend in an extending direction (the front-rear direction) of the upper side section and the lower side section of the body member 300 on the exterior side and the spaces 425 function mainly as the reinforcing mechanism.

What is claimed is:

1. A vehicular door comprising:
a resin outer panel; and
a resin inner panel mounted on a vehicular interior side of the resin outer panel, the resin inner panel including a resin body member that configures an interior design surface of the vehicular door and a resin reinforcing member that is arranged on a vehicular exterior side and opposite a peripheral portion of the resin body member,
the reinforcing member and the resin body member have contact surfaces and are fixed to each other while the contact surfaces are in contact with each other,
the resin outer panel includes an outer side mount portion on a vehicular interior side surface thereof and the resin body member of the resin inner panel includes an inner side mount portion on a vehicular exterior side surface thereof, and
the outer side mount portion and the inner side mount portion are connected to each other such that the resin reinforcing member is disposed between the resin body member and the resin outer panel and the resin outer panel and the resin inner panel are joined together.

2. The vehicular door according to claim 1, wherein
the resin reinforcing member includes a bent section formed from a plate member projected toward the resin outer panel, and
the bent section and the resin body member have a space therebetween.

3. The vehicular door according to claim 2, wherein
the resin body member includes an upper panel section and a lower panel section,
the upper panel section is elongated in a vehicular front-rear direction and is curved toward a vehicular exterior side as it extends from a middle section of the upper panel section with respect to a vertical direction toward an upper section thereof,
the lower panel section is elongated in the vehicular front-rear direction and is curved toward the vehicular exterior side as it extends from a middle section of the lower panel section with respect to the vertical direction toward a lower section thereof, and
the bent section includes an upper bent section and a lower bent section that extend in the vehicular front-rear direction, and the space includes a first space that is present between the upper bent section and a vehicular exterior surface of the upper panel section and a second space that is present between the lower bent section and a vehicular exterior surface of the lower panel section.

4. The vehicular door according to claim 1, wherein the resin reinforcing member is formed in an annular shape along a peripheral portion of the resin body member.

5. The vehicular door according to claim 1, wherein
the resin body member includes a projected section projecting toward a vehicular interior side, and
the projected section includes a functional component that provides a function to the vehicular door.

6. The vehicular door according to claim 1, further comprising an outer reinforcing member that is formed of resin or combination of resin and fiber material and extends in the vehicular front-rear direction and is arranged on the vehicular interior side with respect to an upper section of the outer panel.

7. The vehicular door according to claim 1, further comprising:
a plate member disposed between the resin outer panel and the resin inner panel so as to be lifted and lowered and configuring a door window; and
a buffer member mounted on a vehicular exterior surface of an upper section of the resin reinforcing member to close a space between the vehicular exterior surface of the upper section and the plate member and allow the plate member to be lifted and lowered.

8. The vehicular door according to claim 1, further comprising an impact beam mounted on a vehicular interior side of a lower section of the resin outer panel and extending in the vehicular front-rear direction and absorbing shock from the vehicular exterior side, wherein
the resin reinforcing member includes a bent section that overlaps the impact beam with respect to a vehicular interior-exterior direction and is formed from a plate member bent to project toward the resin outer panel, and
the bent section and the resin body member have a space therebetween.

9. The vehicular door according to claim 1, wherein
the resin body member has an opening,
the resin inner panel has a hole between the resin body member and the resin reinforcing member at a lower section of the resin inner panel and opposite the opening, and
the resin reinforcing member includes a cover member covering the hole from the vehicular exterior side of the resin body member.

10. The vehicular door according to claim 1, wherein
the resin reinforcing member has a frame shape including a rear wall and an upper wall, and the rear wall extends from a vehicular rear section of the resin reinforcing member toward the resin inner panel and the upper wall extends from an upper section of the resin reinforcing member toward the resin inner panel,
the rear wall has a locking mechanism mounting portion in which a locking mechanism for locking the vehicular door with a vehicular body is mounted, and
the locking mechanism mounting portion is thicker than the upper wall.

11. The vehicular door according to claim 1, wherein
the resin reinforcing member includes a frame-shaped plate portion that has a frame shape corresponding to peripheral portions of the resin outer panel and the resin body member and has a hole in an inner portion, and a wall portion that extends from a hole edge of the hole on an interior surface of the frame-shaped plate portion toward the resin body member, wherein the wall portion extends along the hole edge.

12. The vehicular door according to claim 1, wherein
the resin reinforcing member includes a frame-shaped plate portion that extends along the peripheral portion of the resin body member and includes a void space in a hole that is in an inner portion of the resin reinforcing member.

13. A vehicular door comprising:
a resin outer panel; and
a resin inner panel mounted on a vehicular interior side of the resin outer panel, the resin inner panel including a resin body member that configures an interior design surface of the vehicular door and a resin reinforcing member that is arranged on a vehicular exterior side and opposite a peripheral portion of the resin body member,
the resin reinforcing member includes a frame-shaped plate portion that has a frame shape corresponding to peripheral portions of the resin outer panel and the resin body member and has a hole in an inner portion, and a wall portion that extends from a hole edge of the hole on an interior surface of the frame-shaped plate portion toward the resin body member, wherein the wall portion extends along the hole edge,
the frame-shaped plate portion extends along the peripheral portion of the resin body member and includes a void space in the hole,
the reinforcing member and the resin body member have contact surfaces and are fixed to each other while the contact surfaces are in contact with each other,
the resin outer panel includes an outer side mount portion on a vehicular interior side surface thereof and the resin body member of the resin inner panel includes an inner side mount portion on a vehicular exterior side surface thereof, and
the outer side mount portion and the inner side mount portion are connected to each other such that the resin reinforcing member is disposed between the resin body member and the resin outer panel and the resin outer panel and the resin inner panel are joined together.

14. The vehicular door according to claim 13, wherein
the frame-shaped plate portion, the wall portion, and the peripheral portion of the resin body member define and surround a space.

* * * * *